United States Patent
Kimchi et al.

(10) Patent No.: US 10,556,709 B1
(45) Date of Patent: Feb. 11, 2020

(54) ENERGY-EFFICIENT LAUNCH SYSTEM FOR AERIAL VEHICLES

(71) Applicant: Amazon Technologies, Inc., Seattle, WA (US)

(72) Inventors: Gur Kimchi, Bellevue, WA (US); Louis LeRoi LeGrand, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 376 days.

(21) Appl. No.: 15/451,218

(22) Filed: Mar. 6, 2017

(51) Int. Cl.
*B64F 1/08* (2006.01)
*B64D 1/12* (2006.01)
*B64D 27/10* (2006.01)
*B64D 27/16* (2006.01)
*B64C 39/02* (2006.01)

(52) U.S. Cl.
CPC .............. *B64F 1/08* (2013.01); *B64C 39/024* (2013.01); *B64D 1/12* (2013.01); *B64D 27/10* (2013.01); *B64D 27/16* (2013.01); *B64C 2201/021* (2013.01); *B64C 2201/042* (2013.01); *B64C 2201/048* (2013.01); *B64C 2201/082* (2013.01); *B64C 2201/104* (2013.01)

(58) Field of Classification Search
CPC ...... B64F 1/04; B64F 1/06; B64F 1/08; B64F 3/02; B64C 2201/08; B64C 2201/084; B64C 2201/205; B64D 1/12; B64D 3/00; B64D 3/02; B64D 5/00; B64G 1/002; B64G 1/005
See application file for complete search history.

(56) References Cited

U.S. PATENT DOCUMENTS

| | | | |
|---|---|---|---|
| 1,802,254 A * | 4/1931 | Holland | B64F 1/04 244/63 |
| 9,248,910 B1 * | 2/2016 | Vander Lind | B64F 1/36 |
| 9,944,410 B1 * | 4/2018 | Budd | B64C 31/02 |
| 10,399,702 B2 * | 9/2019 | McGeer | B64F 1/04 |
| 2011/0266809 A1 * | 11/2011 | Calverley | F03D 5/00 290/55 |
| 2017/0107974 A1 * | 4/2017 | Goessling | F03D 7/026 |

OTHER PUBLICATIONS

Bangham, M.E. et al. "Tether Transportation System Study"; NASA/TP—1998-206959; 97 pages, Mar. 1998.
FAA Maneuvering in Space 4.1.5, 32 pages.
(Continued)

*Primary Examiner* — Richard R. Green
*Assistant Examiner* — Steven J Shur
(74) *Attorney, Agent, or Firm* — Athorus, PLLC

(57) ABSTRACT

An energy-efficient launch system that utilizes the principles of whip dynamics to launch payloads at high speeds is described. The launch system may include a marine vehicle having an onboard power source. A tapered, superconducting cable may be retractably connected to the marine vehicle via a winch and electrically connected to the power source. One or more aerial vehicles may be coupled to and receive power via the cable. To launch a payload at the end of the cable, the marine vehicle, winch, and/or aerial vehicles may be operated in coordination to create, propagate, and accelerate a whip waveform along the cable toward the payload.

20 Claims, 15 Drawing Sheets

(56) References Cited

OTHER PUBLICATIONS

Goriely, Alain et al. "Shape of a Cracking Whip", Physical Review Letters, 88 (24), pp. 244301-1-244301-4, Jun. 17, 2002.
Hoyt, R. "Design and Simulation of a Tether Boost Facility for LEO—GTO Transport", AIAA 2000-3866, 36th AIAA/ASME/SAE/ASEE Joint Propulsion Conference & Exhibit, Huntsville, AL, 10 pages, Jul. 17-19, 2000.
Lorenzini, E.C. et al. "Mission Analysis of Spinning Systems For Transfers From Low Orbits to Geostationary", Harvard-Smithsonian Center for Astrophysics, Preprint Series No. 4803, 27 pages, Jun. 18, 1999.
McMillen, Tyler et al. "Whip waves", Physica D 184, pp. 192-225, 2003.
NASA, "What is an Orbit", Jul. 7, 2010, pp. 1-9, URL=https://www.nasa.gov/audience/forstudents/5-8/features/nasa-knows/what-is-orbit-58.html, download date Jan. 31, 2017.
NASA, Catalog of Earth Satellite Orbits : Feature Articles; URL=http://earthobservatory.nasa.gov/Features/OrbitsCatalog/printall.php; pp. 1-10, download date Jan. 30, 2017.

* cited by examiner

ENERGY-EFFICIENT LAUNCH SYSTEM FOR AERIAL VEHICLES

BACKGROUND

Aerial vehicles, such as automated aerial vehicles, are increasing in use. For example, unmanned aerial vehicles are often used for surveillance, and their intended uses are increasing, such as for delivering payloads rapidly and efficiently. However, existing methods of launching aerial vehicles generally rely on energy-inefficient processes. For example, in order to launch a payload at high speed, conventional processes utilize fuel, e.g., rocket fuel, to launch aerial vehicles. In addition, the fuel must be carried by the aerial vehicle that is being launched, thereby increasing the weight of the aerial vehicle and requiring correspondingly more energy to complete such a launch. Accordingly, it may be desirous to launch aerial vehicles and/or their payloads at high speed using energy-efficient, controlled, and repeatable processes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
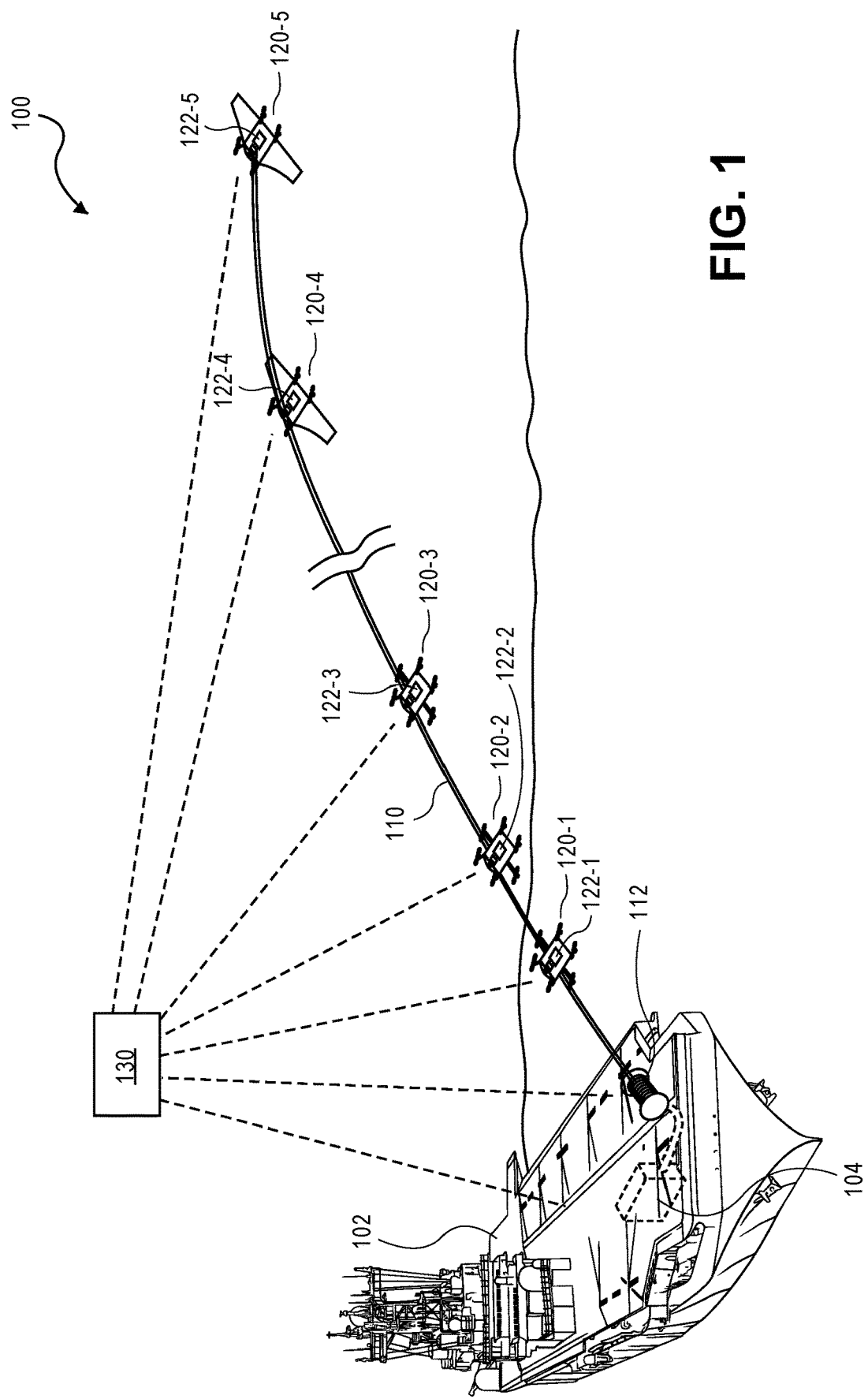
FIG. 1 is a schematic diagram of a launch system, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an energy-efficient launch system that may be used to launch aerial vehicles and/or payloads carried by aerial vehicles. For example, the launch system may include a vehicle, e.g., a marine vessel, having an on-board power source or generator, e.g., a nuclear power generator. Attached to the vehicle may be a cable, e.g., a superconducting cable, through which power from the power source aboard the vehicle may be transmitted to aerial vehicles coupled to the cable. The cable may be retractably attached, e.g., using a winch, at a first end to the vehicle, and may have a tapered diameter that decreases along its length toward a second, free end of the cable. Further, one or more aerial vehicles may be spaced along and movably or detachably coupled to the cable. Aerial vehicles of various sizes and configurations may be coupled to the cable, e.g., octocopters, hexacopters, quadcopters, aerial vehicles with one or more fixed wings, aerial vehicles with other types of propulsion mechanisms, or combinations thereof. A final aerial vehicle coupled to the second, free end of the cable may carry a payload to be launched, or may be the payload itself.

In some implementations, in order to launch the payload, a launch sequence may be initiated as described herein. The vehicle may pull the cable and any coupled aerial vehicles in a launch direction. In addition, the cable may be retracted by the winch, and/or the aerial vehicles may be operated in coordination. For example, one or more of the pulling by the vehicle, the retracting of the cable, and/or the operation of the aerial vehicles may introduce a waveform, e.g., a whip waveform, along a portion of the cable near the first end. The waveform may have an initial speed and an initial shape, e.g., approximately a half-wave, a full-wave, or a loop. The continued coordination among the pulling by the vehicle, the retracting of the cable, and/or the operation of the aerial vehicles may cause the waveform to propagate along the length of the cable toward the second, free end. Similar to whip dynamics, due to one or more of the tapered diameter of the cable, the pulling by the vehicle, the retracting of the cable, and/or the forces exerted on the cable by the aerial vehicles, the waveform may accelerate as it propagates toward the second, free end. Upon the waveform reaching the second, free end of the cable, the payload may be released from the cable at a final speed greater than the initial speed, thereby launching the payload.

In example implementations, after the payload is released, a new payload may be reloaded at the second, free end of the cable. If the final aerial vehicle released the payload that was launched but did not itself decouple from the cable, the final aerial vehicle may be maneuvered to engage a new payload for launch. For example, the final aerial vehicle may return to the vehicle to engage a new payload, may receive a new payload from a separate aerial vehicle that maneuvers proximate to the final aerial vehicle, or may engage a new payload from any other suitable location, either manually or automatically. If the final aerial vehicle was launched together with the payload or was the payload itself, a new final aerial vehicle may be coupled to the second, free end of the cable. For example, the new final aerial vehicle may be coupled to the cable at the vehicle, may be coupled while the second, free end of the cable is still airborne and carried by the other, still coupled aerial vehicles, or may be coupled at any other suitable location, either manually or automatically.

In other implementations, the launch system may successively launch multiple payloads. For example, multiple aerial vehicles, each carrying a respective payload, may be coupled to the cable. After launching the final aerial vehicle at the second, free end of the cable, a next most distal aerial vehicle, i.e., the aerial vehicle closest to the second, free end of the cable, may be prepared for launch. In some examples, the cable may include multiple attachment or coupling points along its length, and after each launch sequence, each of the aerial vehicles may decouple from the cable, slide or traverse toward the second, free end to a next attachment point, and then couple to the cable at the next attachment point. Then, the aerial vehicle that is now coupled to the cable at the second, free end may be prepared for launch. In other examples, the cable may be formed as multiple, discrete sections, with one or more aerial vehicles retractably carrying at least one section of the cable. In this example, when the final aerial vehicle is launched, the final aerial vehicle may retain and/or retract a section of the cable, and after each launch sequence, a new final aerial vehicle, i.e., the aerial vehicle now at the second, free end of the cable, may be prepared for launch.

In other implementations, after the payload is launched, e.g., into low earth orbit (LEO), an orbital transfer system may alter the orbital path of the payload. For example, the orbital transfer system may include a platform including a power source, a tether retractably coupled to the platform, and a grasping mechanism at the end of the tether opposite the platform. The orbital transfer system may be maintained in low earth orbit in order to rendezvous with the payload and transfer the payload to a different orbital path, e.g., a geosynchronous or geostationary orbit (GEO). When the orbital transfer system and the payload reach a rendezvous point along their respective orbital paths, the grasping mechanism of the orbital transfer system may couple with the payload. After coupling, the orbital transfer system may cause an increase in the orbital velocity of the payload, e.g., at least by rotating about its center of mass while proceeding along its orbital path. Upon reaching a release point associated with an intended, new orbital path for the payload, the grasping mechanism may decouple from the payload, thereby altering the orbital path of the payload to the new orbital path. One or more orbital transfer systems may be used to alter the orbital path of the payload, e.g., to transfer the payload from LEO to GEO.

While the examples discussed herein primarily focus on a marine vehicle that pulls, via a winch, a cable having one or more aerial vehicles attached thereto, it will be appreciated that the implementations discussed herein may be used with other forms and configurations of vehicles, power sources, retraction mechanisms, cables, and aerial vehicles.

FIG. 1 illustrates a schematic diagram of a launch system 100, according to an implementation. The launch system 100 may include a vehicle 102, e.g., a marine vehicle, having an onboard power source 104, e.g., a nuclear power generator. Attached to the marine vehicle via a retraction mechanism 112, e.g., a winch, may be a cable 110, such as a superconducting cable. One or more aerial vehicles 120 may be spaced along and coupled to the cable 110 between a first end attached to the winch 112 and up to and including a second, free end of the cable 110 distal from the first end. In addition, one or more of the aerial vehicles 120 may carry a payload 122. For example, as shown in FIG. 1, at least five aerial vehicles 120-1, 120-2, 120-3, 120-4, 120-5 are coupled to the cable 110, and each of the five aerial vehicles carries a respective payload 122-1, 122-2, 122-3, 122-4, 122-5. Further, each of the vehicle 102, retraction mechanism 112, and the aerial vehicles 120 may be in communication with each other and/or with a launch control system 130.

The vehicle 102 may be any type of marine vehicle, submarine vehicle, aerial vehicle, or land-based vehicle capable of housing the power source 104 and pulling the cable 110 with one or more aerial vehicles 120 coupled thereto. For example, the vehicle 102 may be a large marine vessel, e.g., up to and including an aircraft carrier. The power source 104 may be any type of power generator capable of generating enough electrical power to operate the one or more aerial vehicles 120 coupled to the cable 110, as well as potentially operating the vehicle 102 and the retraction mechanism 112. For example, the power source 104 may be a nuclear power generator, a diesel power generator, or other type of power generator. The marine vehicle may be capable of traveling at speeds up to approximately 50-100 knots. Due at least in part to the pulling of the cable 110 by the vehicle 102, a waveform may be introduced and/or propagated from the first end toward the second end of the cable in a manner similar to whip dynamics, in order to launch a payload from the second, free end of the cable. For example, the vehicle 102 may include an additional mechanism or structure (not shown), e.g., a boom arm or other similar structure, to at least partially introduce the waveform to the cable 110.

The cable 110 may be any type of cable suitable for carrying one or more aerial vehicles 120 coupled thereto. In addition, the cable 110 may be capable of transmitting electrical power from the power source 104 to one or more aerial vehicles 120. For example, the cable 110 may be a superconducting cable. In addition, the cable 110 may have a diameter that tapers from a first larger diameter at a first end attached to the retraction mechanism 112 on the vehicle 102 to a second smaller diameter at a second, free end distal from the first end. Alternatively or in addition, the cable 110 may have a varying flexibility along its length, such that the first end of the cable has greater stiffness and the second, free end of the cable has greater flexibility. Due at least in part to the varying diameter and/or the varying flexibility of the cable 110 along its length, a waveform may be introduced and/or propagated from the first end toward the second end in a manner similar to whip dynamics, in order to launch a payload from the second, free end of the cable at a high speed.

Further, the cable 110 may be a bundle of cables, filaments, fibers, tubes, or conduits. Individual components of the bundled cable 110 may be made of different materials and/or provide different properties and characteristics to the cable. For example, at least one component of the bundled cable 110 may transmit power, e.g., electrical power, from the power source 104 to the aerial vehicles 120. One or more other components of the bundled cable 110 may provide the desired weight, density, diameter, flexibility, or other characteristics to the cable 110. In addition, the components of the cable 110 may vary or change along its length, e.g., to provide an increased flexibility to the second, free distal end of the cable relative to the first end or to provide a decreased weight, density, and/or diameter to the second, free distal end of the cable relative to the first end.

Furthermore, the cable may include along its length a plurality of attachment or coupling points to which the aerial vehicles can selectively couple or decouple. In addition or alternatively, the cable may be formed as multiple discrete sections that are each carried and/or retractable by one or more of the aerial vehicles 120. For example, the cable and/or the multiple discrete sections of the cable may have a combined length of up to approximately 50 miles or 500 miles.

The retraction mechanism 112 may be any type of retraction mechanism capable of extending and retracting the cable 110 having one or more aerial vehicles 120 coupled thereto. For example, the retraction mechanism 112 may be a winch, spool, or other similar mechanism. Due at least in part to the retracting of the cable 110 by the retraction mechanism 112, a waveform may be introduced and/or propagated from the first end toward the second end in a manner similar to whip dynamics, in order to launch a payload from the second, free end of the cable. For example, the retraction mechanism 112 may include an additional mechanism or structure (not shown), e.g., a boom arm or other similar structure, to at least partially introduce the waveform to the cable 110.

In other implementations, the cable 110 may be formed as a complete loop with both ends attached to the same or different retraction mechanisms 112 at the vehicle 102. In this example, the cable 110 may also be tapered from larger diameters at the ends attached to the vehicle 102 toward a smaller diameter at the portion of the cable 110 that carries the payload to be launched. Further, the looped cable 110 may also include one or more additional loops that act as the waveform(s) that propagate and accelerate along the cable to launch payloads. The one or more additional loops may travel and accelerate along the looped cable 110 using any of the methods described herein. In addition or alternatively, the one or more additional loops may be manipulated to vary their size and/or shape, thereby accelerating or decelerating the rate of travel of the additional loop(s) along the looped cable 110. The attachment of both ends of the looped cable 110 to the same or different retraction mechanisms 112 may allow greater control of various parameters of the cable, e.g., length, retraction speed and/or acceleration, extension speed and/or acceleration, etc., and thereby greater control of any waveform that propagates and accelerates along the cable.

The aerial vehicles 120 spaced along and coupled to the cable 110 may comprise multiple different types of aerial vehicles 120. For example, as shown schematically in FIG. 1, aerial vehicles 120-1, 120-2, 120-3 are illustrated as hexacopters, and aerial vehicles 120-4 and 120-5 are illustrated as combination propeller and fixed-wing vehicles. Other types of aerial vehicles 120 may also be coupled to the cable 110, including octocopters, quadcopters, other types of propeller-operated aerial vehicles, aerial vehicles having only fixed wings, aerial vehicles of various sizes, aerial vehicles having various other types of propulsion mechanisms, including fans, jets, turbojets, turbo fans, jet engines, electric jets, and the like, and/or combinations thereof. Although five aerial vehicles 120 are shown in FIG. 1, fewer or more aerial vehicles 120 may be coupled to the cable 110.

In some implementations of the launch system 100 having shorter cable lengths much less than 500 miles, only one aerial vehicle 120-5 may be coupled to the second, free end of the cable 110. The aerial vehicle 120-5 may have any of the various configurations and propulsion mechanisms discussed herein. In other implementations of the launch system 100 having longer cable lengths up to and including approximately 500 miles, a plurality of aerial vehicles may be spaced along and coupled to the cable 110. For example, aerial vehicles 120 coupled to the cable closer to the first end may be relatively larger in size and/or have configurations and propulsion mechanisms such as octocopters, hexacopters, quadcopters, or other propeller-operated aerial vehicles, whereas aerial vehicles 120 coupled to the cable closer to the second, free end may be relatively smaller in size and/or have configurations and propulsion mechanisms such as fixed wings, fans, jets, turbojets, turbo fans, jet engines, electric jets, and the like. Other combinations of aerial vehicle configurations and propulsion mechanisms, including aerial vehicles having multiple types of propulsion mechanisms or aerial vehicles having only fixed wings and no propulsion mechanisms, are possible in order to launch payloads using the launch system 100 of FIG. 1.

The launch control system 130 may communicate (via wired or wireless communication) with the vehicle 102, the retraction mechanism 112, and/or each of the aerial vehicles 120 in order to receive and/or transmit data and information regarding their operation. For example, the launch control system 130 may transmit instructions to each of the vehicle 102, the retraction mechanism 112, and/or each of the aerial vehicles 120 in order to coordinate their operation to launch payloads. As discussed in further detail with respect to FIG. 12, the launch control system 130 may control at least the operation, routing, navigation, and communication by and among the vehicle 102, the retraction mechanism 112, and/or each of the aerial vehicles 120 to launch payloads.

The launch system 100 described herein utilizes principles of whip dynamics in order to launch payloads in an energy-efficient manner. The launch system 100 further leverages the cable 110 that acts as the whip in order to provide power to the aerial vehicles 120 coupled to the cable 110 from a remote power source 104 on the vehicle 102, such that the whip dynamics are not diminished by added weight associated with any fuel carried by each aerial vehicle.

A whip generally includes the following components: a handle, a tapered filament attached to the handle called a thong, and a small string attached to the end of the thong called a cracker. In order to crack a whip, a waveform having an initial shape and an initial speed is introduced at the handle by a user. For example, the initial shape can be approximately a half-wave, a full-wave, or a loop. The waveform then propagates along the thong, accelerating at least in part due to the tapering diameter of the filament. As the accelerated waveform reaches the cracker, a well-executed initial motion of the whip can result in a cracking sound. In addition, because the cracker is at the free end of the whip, i.e., is relatively unconstrained in its motion as compared to the handle held by the user, the waveform may further accelerate the cracker to create the cracking sound. Furthermore, after a user introduces a waveform at the handle, the user may continue to pull the handle in a direction away from the propagating waveform, i.e., the user may "follow through" to complete his motion. Such pulling of the handle away from the waveform may further accelerate the waveform along the thong towards the cracker. As a result of the combination of the initial waveform, the tapering diameter of the thong, the relatively unconstrained free end, and/or the pulling of the handle, it is generally understood that the cracking of a whip can break the sound barrier, i.e., at least the waveform and/or the free end of a whip can travel at a speed greater than the speed of sound, which is approximately 340 m/s.

Similar to the whip dynamics that occur with a standard whip, the launch system 100 described herein utilizes principles of whip dynamics to accelerate a payload at the end of the cable 110. For example, in the launch system 100, the vehicle 102 and/or the retraction mechanism 112 may be similar to the handle of a standard whip, a portion of the cable 110 may be similar to the thong of a standard whip, and the second, free end of the cable 110 may be similar to the cracker of a standard whip. In addition, at least one of the vehicle 102, the retraction mechanism 112, and/or the aerial vehicles 120 closer to the first end of the cable 110 may introduce a waveform having an initial shape and an initial speed near the first end of the cable 110. The vehicle 102 and/or the retraction mechanism 112 may provide a pulling force to initiate a waveform, and/or the aerial vehicles 120 may be operated to introduce a waveform along at least a portion of the cable 110. The cable 110 may have a tapering diameter along its length from the first end to the second end, thereby causing an acceleration in the waveform. Further, the aerial vehicles 120 may be operated in coordination in order to cause the waveform to propagate and accelerate along the cable 110 towards the second end. Moreover, the vehicle 102 and/or the retraction mechanism 112 may continue to provide a pulling force in a direction away from the waveform propagating along the cable 110. As a result of the combination of the initial waveform introduced by at least one of the vehicle 102, the retraction mechanism 112, and/or the aerial vehicles 120, the tapering diameter of the cable 110, the relatively unconstrained free end of the cable 110, the coordinated operation of the aerial vehicles 120, and/or the continued pulling by at least one of the vehicle 102 and/or the retraction mechanism 112, a payload at the second end of the cable 110 may be accelerated and launched at a final speed greater than the initial speed of the waveform.

Figure 2A:
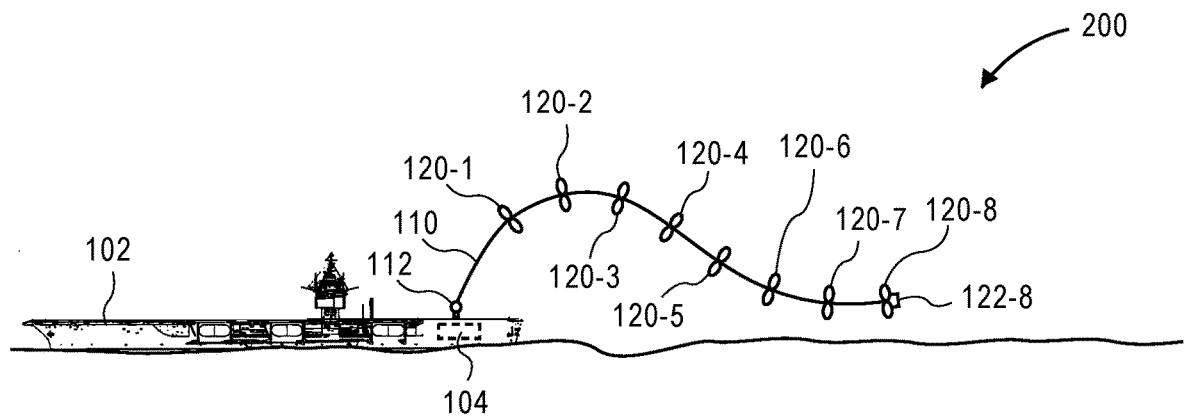
FIG. 2A is a schematic diagram of an initial configuration of a launch process, according to an implementation.
Figure 2B:
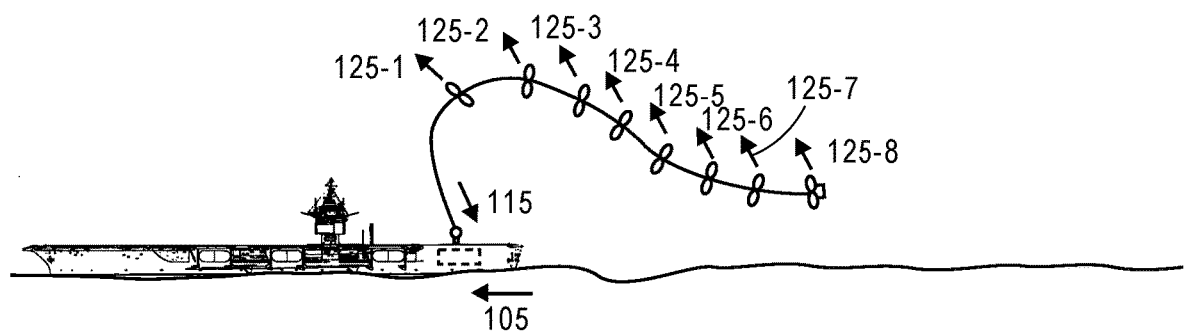
FIG. 2B is a schematic diagram of an intermediate configuration of a launch process, according to an implementation.
Figure 2C:
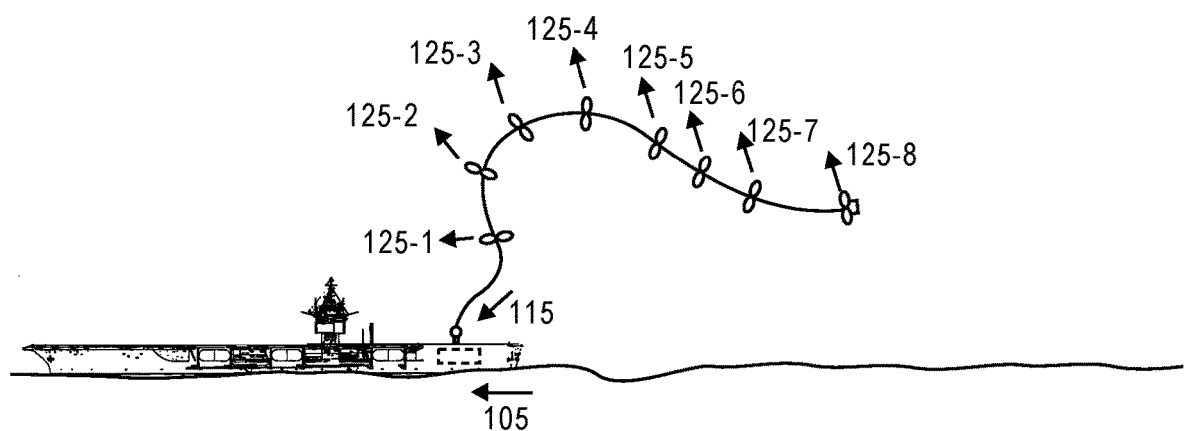
FIG. 2C is a schematic diagram of another intermediate configuration of a launch process, according to an implementation.
Figure 2D:
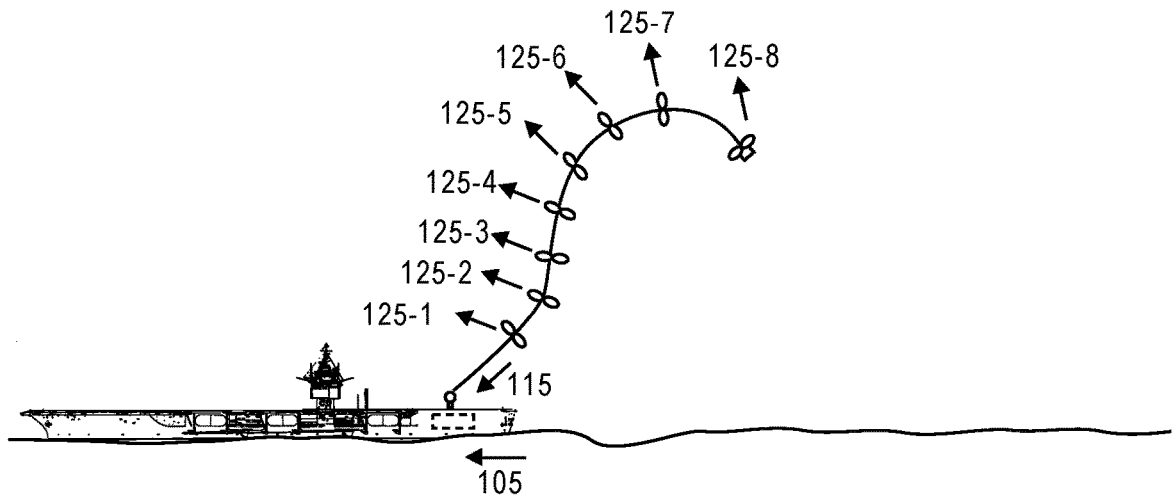
FIG. 2D is a schematic diagram of yet another intermediate configuration of a launch process, according to an implementation.
Figure 2E:
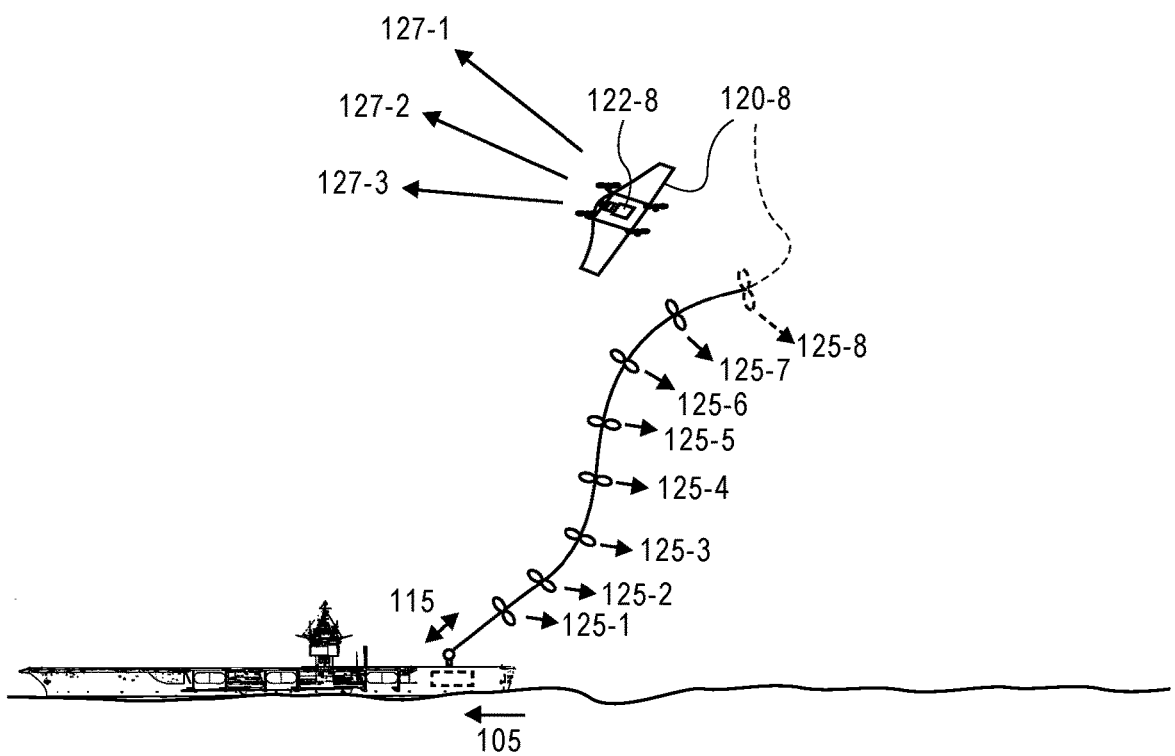
FIG. 2E is a schematic diagram of a final configuration of a launch process, according to an implementation.

FIGS. 2A-2E illustrate a sequence of schematic diagrams of a launch process 200, according to an implementation. For example, FIG. 2A illustrates a schematic diagram of an initial configuration of the launch process 200, FIGS. 2B-2D illustrate schematic diagrams of intermediate configurations of the launch process 200, and FIG. 2E illustrates a schematic diagram of a final configuration of the launch process 200. Although FIGS. 2A-2E illustrate eight aerial vehicles 120-1, 120-2, 120-3, 120-4, 120-5, 120-6, 120-7, 120-8 spaced along and coupled to the cable 110, any number of fewer or more aerial vehicles 120 may be included in the launch system 100 as described herein.

Referring to FIG. 2A, the vehicle 102, the power generator 104, the retraction mechanism 112, the cable 110, and the plurality of aerial vehicles 120 are shown in an example initial configuration, e.g., a pre-launch configuration. In this initial configuration, the vehicle 102 may be stationary or pulling the cable 110 at a slow speed as needed to maintain the initial configuration. In addition, the retraction mechanism 112 may be holding, extending, or retracting the cable as needed to maintain the initial configuration. Further, the power generator 104 may be operating to provide power via the cable 110 to one or more of the aerial vehicles 120. Moreover, the aerial vehicles 120 may be operating in coordination to maintain the cable 110 in the initial configuration.

The initial configuration may be determined based at least on launch parameters associated with the payload carried by the final aerial vehicle, e.g., the payload 122-8 carried by aerial vehicle 120-8 in FIGS. 2A-2E. For example, the initial configuration may be determined based on various launch parameters, including the speed and/or acceleration of the vehicle 102, the retracting force, speed, and/or acceleration of the retraction mechanism 112, the length, diameter, and/or flexibility of the cable 110, the thrusting force, direction, and/or acceleration of the one or more aerial vehicles 120, the intended launch speed and/or trajectory of the payload, and other factors related to the launch system 100.

Referring to FIG. 2B, a first intermediate configuration of the launch process 200 is shown. The vehicle 102 is pulling the cable 110 with a pulling force in the direction of arrow 105. The retraction mechanism is retracting the cable 110 with a retracting force in the direction of arrow 115. In addition, the aerial vehicles 120 are shown exerting pushing and/or pulling forces 125 on the cable 110. As a result of a combination of the pulling force 105 of the vehicle 102, the retracting force 115 of the retraction mechanism 112, and/or the forces 125 exerted on the cable 110 by the aerial vehicles 120, a waveform may be introduced along at least a portion of the cable 110 near the first end. As shown in FIG. 2B, the aerial vehicles 120-1, 120-2, 120-3 closer to the first end of the cable 110 may exert larger forces 125-1, 125-2, 125-3 on the cable 110 to attain the first intermediate configuration as compared to the forces 125-4, 125-5, 125-6, 125-7, 125-8 exerted by other aerial vehicles 120-4, 120-5, 120-6, 120-7, 120-8 closer to the second end of the cable 110.

Referring to FIG. 2C, a second intermediate configuration of the launch process 200 is shown. The vehicle 102 continues to pull the cable 110 with a pulling force in the direction of arrow 105. The retraction mechanism continues to retract the cable 110 with a retracting force in the direction of arrow 115. In addition, the aerial vehicles 120 are shown exerting pushing and/or pulling forces 125 on the cable 110. As a result of a combination of the pulling force 105 of the vehicle 102, the retracting force 115 of the retraction mechanism 112, and/or the forces 125 exerted on the cable 110 by the aerial vehicles 120, the waveform may propagate and accelerate from the first end toward the second end of the cable 110. As shown in FIG. 2C, the aerial vehicles 120-2, 120-3, 120-4, 120-5 along an intermediate section of the cable 110 may exert larger forces 125-2, 125-3, 125-4, 125-5 on the cable 110 to attain the second intermediate configuration as compared to the forces 125-1, 125-6, 125-7, 125-8 exerted by other aerial vehicles 120-1, 120-6, 120-7, 120-8 closer to either the first end or the second end of the cable 110.

Referring to FIG. 2D, a third intermediate configuration of the launch process 200 is shown. The vehicle 102 continues to pull the cable 110 with a pulling force in the direction of arrow 105. The retraction mechanism continues to retract the cable 110 with a retracting force in the direction of arrow 115. In addition, the aerial vehicles 120 are shown exerting pushing and/or pulling forces 125 on the cable 110. As a result of a combination of the pulling force 105 of the vehicle 102, the retracting force 115 of the retraction mechanism 112, and/or the forces 125 exerted on the cable 110 by the aerial vehicles 120, the waveform may continue to propagate and accelerate from the first end toward the second end of the cable 110. As shown in FIG. 2D, the aerial vehicles 120-5, 120-6, 120-7, 120-8 closer to the second end of the cable 110 may exert larger forces 125-5, 125-6, 125-7, 125-8 on the cable 110 to attain the third intermediate configuration as compared to the forces 125-1, 125-2, 125-3, 125-4 exerted by other aerial vehicles 120-1, 120-2, 120-3, 120-4 closer to the first end of the cable 110.

Referring to FIG. 2E, a final configuration of the launch process 200 is shown immediately after the payload 122-8 has been launched. As a result of a combination of the pulling force 105 of the vehicle 102, the retracting force 115 of the retraction mechanism 112, and/or the forces 125 exerted on the cable 110 by the aerial vehicles 120 up to the launch of the payload, the waveform may continue to propagate and accelerate toward the second end of the cable 110, such that the payload 122-8 and/or the final aerial vehicle 120-8 is launched along a launch path 127 in accordance with the launch parameters. Depending on the launch parameters, the payload 122-8 and/or the final aerial vehicle 120-8 may be launched along various launch paths 127-1, 127-2, 127-3. Although only three potential launch paths 127 are illustrated, many other launch paths 127 are possible with the launch system 100. After the payload 122-8 has been the launched, the vehicle 102 may stop pulling or continue pulling the cable 110 with a pulling force in the direction of arrow 105 as needed to control the cable 110. The retraction mechanism may stop retracting, continue retracting, or begin extending the cable 110 with a retracting or extending force in the direction of arrow 115 as needed to control the cable 110. In addition, the aerial vehicles 120 are shown exerting pushing and/or pulling forces 125 on the cable 110 as needed to control the cable 110. As shown in FIG. 2E, the aerial vehicles 120-1, 120-2, 120-3, 120-4, 120-5, 120-6, 120-7 (and 120-8 if not launched) still coupled to the cable 110 may exert forces 125-1, 125-2, 125-3, 125-4, 125-5, 125-6, 125-7 (and 125-8 if not launched) on the cable 110 as needed to control the cable 110 after launch and/or to prepare the cable 110 for a subsequent launch.

Prior to beginning the launch process 200, it may be desirable to clear the affected air and water space associated with the launch system 100 and the launch process 200. For example, an air space to be traversed by the cable 110 and the aerial vehicles 120, including a corresponding safety distance, may be cleared prior to beginning a launch process 200. Similarly, a water space under the air space to be traversed by the cable 110 and the aerial vehicles 120, including a corresponding safety distance, may be cleared prior to beginning a launch process 200.

In some implementations, the propagation and acceleration of the waveform along the cable 110 during the launch process 200 may result in forces, accelerations, and/or speeds of the cable 110 that are too great to be countered and/or controlled by the vehicle 102, the retraction mechanism 112, and/or the aerial vehicles 120. Alternatively, even if possible, the forces, accelerations, and/or speeds of the cable 110 may cause significant wear and/or potential damage to components of the launch system 100 if attempted to be countered and/or controlled. In such situations, a water space forward of the vehicle 102 and corresponding to the length of the cable 110 at launch, including a corresponding safety distance, as well as an air space to be traversed by the cable 110 after launch, including a corresponding safety distance, may be cleared prior to beginning a launch process 200. Following a launch process 200 that generates great forces, accelerations, and/or speeds of the cable 110, the cable 110 may be allowed to fall into the cleared water space and then may be retracted to the vehicle 102 by the retraction mechanism 112.

In addition, the aerial vehicles 120 may decouple from the cable 110 following completion of the launch process 200, thereby allowing the cable 110 to fall into the cleared water space. Alternatively or in addition, one or more of the aerial vehicles 120 may sequentially decouple from the cable 110 during the launch process 200. For example, as the waveform propagates and accelerates past the attachment point of an aerial vehicle 120, the aerial vehicle 120 may decouple from the cable 110 if further forces exerted by the aerial vehicle 120 on the cable 110 will have minimal or no effect on the further propagation and acceleration of the waveform toward the second end of the cable 110. Using sequential decoupling of the aerial vehicles 120, when the waveform reaches the second end of the cable 110 and launches the payload 122-8, no aerial vehicles 120 may remain coupled to the cable 110 such that the cable 110 may fall into the cleared water space and then may be retracted to the vehicle 102 by the retraction mechanism 112. Alternatively, one or more of the aerial vehicles 120 that are coupled to the cable 110 closest to the vehicle 102 may remain coupled to the cable 110 in order to prevent the cable from contacting portions of the vehicle 102, and/or the vehicle 102 may be maneuvered or turned so as to minimize or prevent any potential contact between the cable 110 and portions of the vehicle 102.

During the launch process as described herein, the second end of the cable may reach, at its highest point, an altitude of up to approximately 500 feet, 2000 feet, or 60,000-70,000 feet (approximately 11-13 miles), which may be associated with the final configuration shown in FIG. 2E at the moment when the payload 122-8 is launched. In addition, the payload 122-8 may be launched at a speed up to, including, and/or exceeding, the escape velocity from Earth, e.g., approximately 25,000 mph or 11.2 km/s from the surface of the Earth. The launch of a payload at such high altitudes and high speeds may be achieved using the energy-efficient, controlled, and repeatable launch process as described herein, which provides at least efficiency, cost, and safety improvements over conventional rocket fuel-based launch systems that require substantial amounts of fuel to be carried and burned by the payload to be launched.

Figure 3A:
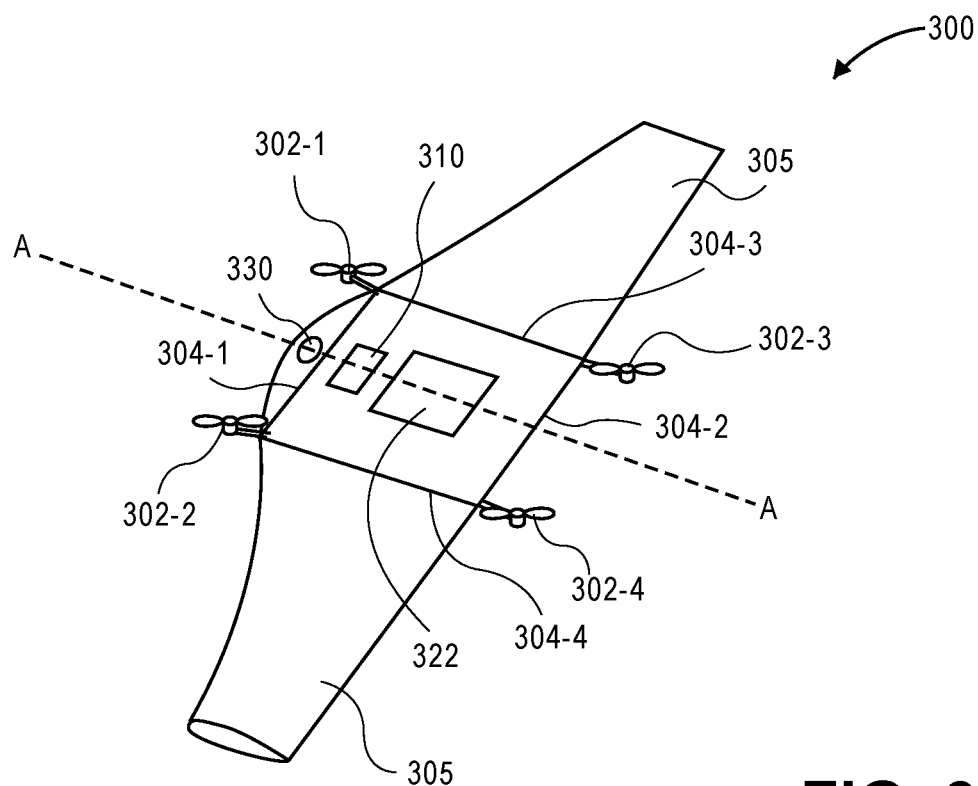
FIG. 3A is a block diagram of an aerial vehicle, according to an implementation.

FIG. 3A illustrates a block diagram of a top perspective view an example aerial vehicle 300, which is an example of the aerial vehicles 120 described with respect to FIGS. 1-2E. For example, FIG. 3A shows an example aerial vehicle 300 having propellers 302 and corresponding propeller motors (not shown), frame members 304, a fixed wing 305, an aerial vehicle control system 310, a payload 322, and an aerial vehicle-cable interface 330. The aerial vehicle 300 may also include a power module (not shown), as well as any other associated electronics and operational, navigational, and/or communication components (not shown). The power module (not shown) may include a battery, capacitor, or any other electrical energy storage component to provide power to various propulsion mechanisms, such as motors, fans, or electric jets. Alternatively or in addition, the power module may include fuel, e.g., rocket fuel, to provide power to various propulsion mechanisms, such as jet engines or thrusters. The power module may primarily be used as backup or reserve power, and may be utilized following completion of the launch process in order to provide additional guidance and/or control after launch. For example, the aerial vehicle 300 may also include one or more rocket engines to provide thrust using onboard rocket fuel in accordance with the launch parameters, e.g., as a second stage providing thrust following completion of the first stage of the launch process using the launch system 100 described herein and/or as an additional means of propulsion and control after launch and during orbit to effect changes to an orbital path. The aerial vehicle 300 is an example of one of many different types of aerial vehicles that may be coupled to the cable 110 of the launch system 100. In other embodiments, for example, the aerial vehicle 300 at the second end of the cable may be only a fixed wing with no propulsion mechanisms, or a rocket with one or more rocket engines that provide thrust using onboard rocket fuel.

The propellers 302 and corresponding propeller motors may provide thrust to the aerial vehicle 300 to maneuver in any direction. While FIG. 3A includes four propellers 302-1, 302-2, 302-3, 302-4 and corresponding propeller motors at particular locations on aerial vehicle 300, any number of propellers and corresponding propeller motors at any suitable locations on aerial vehicle 300 are possible, e.g., hexacopters or octocopters. In addition, while FIG. 3A includes propellers 302 and corresponding propeller motors, any other types of propulsion mechanisms may be used in place of or in combination with the propellers 302 and corresponding propeller motors, including for example fans, jets, turbojets, turbo fans, jet engines, electric jets, and the like.

The frame members 304 may be any suitable structural members configured to support the components of the aerial vehicle 300. For example, as shown in FIG. 3A, the frame members 304-1, 304-2 may have substantially equal lengths, and the frame members 304-3, 304-4 may also have substantially equal lengths, thereby forming a rectangular frame 304 that supports the propellers 302, the fixed wing 305, the aerial vehicle control system 310, the payload 322, the aerial vehicle-cable interface 330, and any other components of the aerial vehicle 300. While FIG. 3A includes four frame members 304, any number of frame members 304 is possible, as well as other shapes, sizes, and/or configurations of the frame members 304.

The example aerial vehicle 300 may also include a fixed wing 305. It may be desirable to couple aerial vehicles having a fixed wing 305 closer to the second, free end of the cable 110, such that these aerial vehicles may maintain lift and/or forward momentum as the waveform that is propagated and accelerated along the cable reaches the second end. For example, for particular launch parameters when a payload is released from the cable 110 at high speed, e.g., at speeds close to or approaching approximately the escape velocity of the Earth, certain propulsion mechanisms such as propellers and corresponding propeller motors may be ineffective or in fact inhibit the launch of the payload. In addition, for particular launch parameters when a payload is released at high altitudes, e.g., at altitudes close to or approaching approximately 60,000-70,000 feet, certain propulsion mechanisms such as propellers and corresponding propeller motors may be ineffective at such high altitudes with correspondingly thin atmosphere. As shown in FIG. 1, while only the aerial vehicles 120-4, 120-5 near the second, free end of the cable 110 are shown as including a fixed wing, any of the aerial vehicles 120 coupled to the cable 110 may include a fixed wing 305. Further, while only one fixed wing 305 is shown in FIG. 3A, any number of fixed wings may be provided on the aerial vehicle 300.

In addition, the fixed wing 305 may be adjustable or reconfigurable by the aerial vehicle 300. For example, the aerial vehicle 300 may maintain a first configuration of the fixed wing 305 at lower speeds, accelerations, and/or altitudes, e.g., a wing configuration having relatively greater surface area and/or a first wing sweep angle, and may transition to a second configuration of the fixed wing 305 at higher speeds, accelerations, and/or altitudes, e.g., a wing configuration having relatively less surface area and/or a second wing sweep angle. In addition, the aerial vehicle 300 may transition between various configurations of the fixed wing, propulsion mechanisms, and/or other components during propagation of the waveform along the cable. For example, an aerial vehicle that includes a fixed wing and propellers with propeller motors may be able to transition between a first configuration, e.g., a wing configuration having relatively greater surface area and/or a first wing sweep angle and a propulsion configuration in which the propellers are providing thrust, into a second configuration, e.g., a wing configuration having relatively less surface area and/or a second wing sweep angle and a propulsion configuration in which the propellers are stowed or stopped. Then, if the propagating waveform is a loop waveform, for example, the aerial vehicle may transition from the first configuration into the second configuration when the loop waveform reaches the aerial vehicle and may transition back to the first configuration when the loop waveform has passed the aerial vehicle. Any other configurations, numbers of configurations, or control strategies of the fixed wing 305, the propulsion mechanisms, and/or other components are possible to facilitate flight, acceleration, and/or control of the aerial vehicle 300 before, during, and/or after the launch process.

Figure 3B:
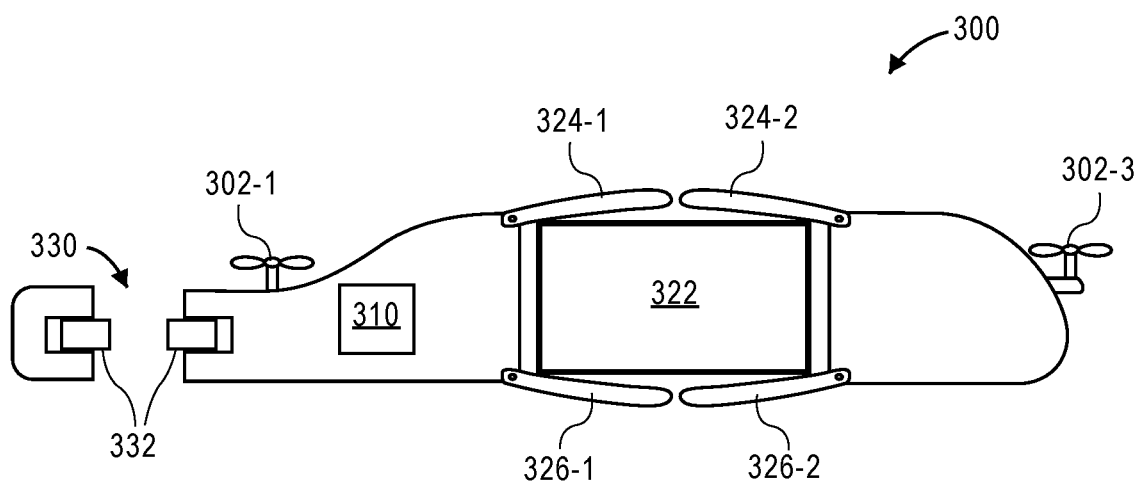
FIG. 3B is a cross-sectional block diagram of the aerial vehicle of FIG. 3A, taken along line A-A in FIG. 3A, according to an implementation.

The aerial vehicle control system 310 may control the operation of various components of the aerial vehicle 300, including the propellers 302 and corresponding propeller motors or other propulsion mechanisms, the payload 322, and the aerial vehicle-cable interface 330, as well as any other components of the aerial vehicle 300. For example, the aerial vehicle control system 310 may transmit instructions to the propellers 302 and corresponding propeller motors (and/or other propulsion mechanisms) to control flight and navigation of the aerial vehicle 300, may transmit instructions to the access doors 324, 326 (FIG. 3B) in order to control release and/or reload of the payload 322, and/or may transmit instructions to the coupling mechanisms 332 (FIG. 3B) of the aerial vehicle-cable interface 330 to control coupling and decoupling of the aerial vehicle 300 to and from the cable 110. While the aerial vehicle control system 310 is shown in FIGS. 3A and 3B at a particular location on aerial vehicle 300, the aerial vehicle control system 310 may be positioned at any suitable location on aerial vehicle 300.

In addition, the aerial vehicle control system 310 may communicate (via wired or wireless communication) with the vehicle 102, the retraction mechanism 112, and/or one or more of the other aerial vehicles 120 in order to receive and/or transmit data and information regarding their operation. For example, the aerial vehicle control system 310 may receive instructions from the launch control system 130 to coordinate its operation with those of the vehicle 102, the retraction mechanism 112, and/or one or more of the other aerial vehicles 120 to launch payloads. As discussed in further detail with respect to FIG. 11, the aerial vehicle control system 310 may control at least the operation, routing, navigation, and communication of the aerial vehicle 300.

The payload 322 may be any suitable item, object, apparatus, or component to be launched using the launch system 100. For example, the payload 322 may be an item to be delivered to a particular location according to the launch parameters via the launch system 100, e.g., the payload may be launched for delivery to a remote delivery location around the globe, such as a particular continent, country, city, or other geographic location within range of the launch system 100. In some implementations, the payload may be delivered to an aerial fulfillment center, storage location, or other staging or relay location to be stored therein and/or for subsequent delivery to another location. An aerial fulfillment center may include, but is not limited to, a fulfillment center (e.g., inventory storage area) that is aerially positioned and supported by an airship that maintains altitude through the use of a lighter than air body of gas. In other implementations, the payload 322 may be a satellite or other apparatus to be launched, according to the launch parameters, into low earth orbit at a speed exceeding the escape velocity from Earth. In still other implementations, the payload 322 may be aerodynamically shaped in order to continue along its launch path after being launched. In further implementations, the aerial vehicle 300 may be the payload 322 itself. That is, the aerial vehicle 300 may be launched by the launch system 100 along a launch path, e.g., toward a particular location or destination. While the payload 322 is shown in FIGS. 3A and 3B at a particular location on aerial vehicle 300, the payload 322 may be positioned at any suitable location on aerial vehicle 300.

Further, in other implementations, the payload 322 may include some or all of the components described herein with respect to the aerial vehicle 300, such that the payload 322 may be able to operate autonomously or semi-autonomously as an aerial vehicle after being launched from the aerial vehicle 300. For example, the payload 322 may include one or more propulsion mechanisms and a control system that may communicate (via wired or wireless communication) with the aerial vehicle control system 310 of the aerial vehicle 300 and/or the launch control system 130. In this example, the control system of the payload 322 may control at least the operation, routing, navigation, and communication of the payload 322.

The aerial vehicle-cable interface 330 may facilitate selectively coupling to and decoupling from the cable 110 of the launch system 100. The aerial vehicle-cable interface may include any suitable coupling mechanism that allows the aerial vehicle 300 to couple to the cable 110 at an attachment point, move between attachment points of the cable 110, and/or decouple from an attachment point of the cable 110. In addition, the aerial vehicle-cable interface may provide an electrical connection between the cable and the aerial vehicle, e.g., for transmission of power to the aerial vehicle from the power source 104 onboard the vehicle 102.

Various example implementations of the aerial vehicle-cable interface are described herein with respect to FIGS. 3C-3I. While FIGS. 3C-3I illustrate various particular example implementations, other implementations of the aerial vehicle-cable interface are also possible, including variations and/or combinations of the implementations described herein.

As shown in FIGS. 3A and 3B, the aerial vehicle-cable interface 330 may be positioned toward a leading edge and forward of the center of mass of the aerial vehicle 300. This position of the aerial vehicle-cable interface 330 may be desirable, for example, for aerial vehicles that are coupled closer to the second, free end of the cable 110, such that during launch, the propagation and acceleration of a waveform toward the second end of the cable 110 may pull the aerial vehicles forward for launch. In some implementations, the aerial vehicle-cable interface 330 may be positioned at any other suitable locations on the aerial vehicle 300, e.g., closer to a center of mass of the aerial vehicle, or toward a trailing edge and rearward of the center of mass of the aerial vehicle. For example, an aerial vehicle-cable interface 330 positioned toward a trailing edge and rearward of the center of mass of the aerial vehicle 300 may be desirable for aerial vehicles that are coupled closer to the first end of the cable 110, such that during launch, the aerial vehicles may push and/or pull the cable 110 in order to introduce, propagate, and/or accelerate a waveform toward the second end of the cable 110. Similarly, an aerial vehicle-cable interface 330 positioned near the center of mass of the aerial vehicle 300 may be desirable for aerial vehicles that are coupled along intermediate sections of the cable 110 between the first end and the second, free end, such that during launch, the aerial vehicles may push and/or pull the cable 110 in order to propagate and accelerate a waveform toward the second end of the cable 110 and/or may be pushed and/or pulled by the propagation and acceleration of a waveform toward the second end of the cable 110.

FIG. 3B illustrates a cross-sectional block diagram of the example aerial vehicle 300 of FIG. 3A, taken along line A-A in FIG. 3A, according to an implementation. In FIG. 3B, the propellers 302-1, 302-3, the aerial vehicle control system 310, the payload 322, and the aerial vehicle-cable interface 330 are shown, as previously described with respect to FIG. 3A.

The payload 322 may be accessible from at least one of the top or the bottom of the aerial vehicle 300. For example, the aerial vehicle 300 may include access doors 324-1, 324-2 on an upper surface thereof. The access doors 324 may facilitate launching or releasing the payload 322 from the aerial vehicle 300, either by launching the payload 322 while the aerial vehicle 300 remains coupled to the cable 110, or by launching the aerial vehicle 300 together with the payload 322 and then later releasing the payload 322. The access doors 324 may be controlled by the aerial vehicle control system 310 and actuated to open or close, e.g., using actuators such as motors, solenoids, pneumatic actuators, hydraulic actuators, or other suitable actuators. Alternatively or in addition, the access doors 324 may be maintained in a closed position with a determined force, e.g., a threshold force, and when the force applied to the aerial vehicle 300 as a result of the launch process exceeds the threshold force, the access doors 324 may transition to an open position due to the force, and the payload 322 may be automatically released from the aerial vehicle 300.

Further, the access doors 324 may be used for reloading a new payload 322 into the aerial vehicle 300. For example, a second aerial vehicle carrying the new payload 322 may maneuver proximate to and above the aerial vehicle 300, and the new payload 322 may be transferred from the second aerial vehicle to the aerial vehicle 300 via the access doors 324. Alternatively, the aerial vehicle 300 may maneuver to an aerial fulfillment center after completing a launch sequence, and the aerial vehicle 300 may receive a new payload 322 from the aerial fulfillment center via the access doors 324, either automatically or manually. In addition, the aerial vehicle 300 may maneuver to the vehicle 102 or another location, and a new payload 322 may be transferred into the aerial vehicle 300 via the access doors 324, either automatically or manually.

Similarly, for example, the aerial vehicle 300 may include access doors 326-1, 326-2 on a lower surface thereof. The access doors 326 may facilitate launching or releasing the payload 322 from the aerial vehicle 300, either by launching the payload 322 while the aerial vehicle 300 remains coupled to the cable 110 or by launching the aerial vehicle 300 together with the payload 322 and then later releasing the payload 322. The access doors 326 may be controlled by the aerial vehicle control system 310 and actuated to open or close, e.g., using actuators such as motors, solenoids, pneumatic actuators, hydraulic actuators, or other suitable actuators. Alternatively or in addition, the access doors 326 may be maintained in a closed position with a determined force, e.g., a threshold force, and when the force applied to the aerial vehicle 300 as a result of the launch process exceeds the threshold force, the access doors 326 may transition to an open position due to the force, and the payload 322 may be automatically released from the aerial vehicle 300.

Further, the access doors 326 may be used for reloading a new payload 322 into the aerial vehicle 300. For example, a second aerial vehicle carrying the new payload 322 may maneuver proximate to and below the aerial vehicle 300, and the new payload 322 may be transferred from the second aerial vehicle to the aerial vehicle 300 via the access doors 326. Alternatively, the aerial vehicle 300 may maneuver to an aerial fulfillment center after completing a launch sequence, and the aerial vehicle 300 may receive a new payload 322 from the aerial fulfillment center via the access doors 326, either automatically or manually. In addition, the aerial vehicle 300 may maneuver proximate to and above a new payload 322, e.g., at the vehicle 102 or at another location, which may be transferred into the aerial vehicle 300 via the access doors 326, either automatically or manually.

Although FIG. 3B shows the payload 322 as being retained and released via access doors 324, 326, other configurations for loading, retaining, and/or releasing the payload 322 are possible. For example, in place of or in combination with the access doors 324, 326, other payload engagement mechanisms may be used including grasping mechanisms having opening/closing arms or digits, suction mechanisms, electro-adhesion mechanisms, magnetic attachment mechanisms, roller- or conveyor-type mechanisms, and the like.

Figure 3C:
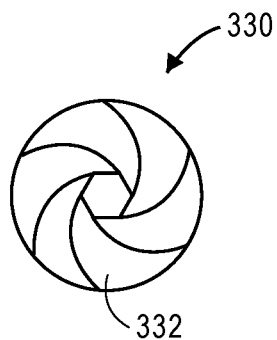
FIG. 3C is a schematic diagram of a first aerial vehicle-cable interface, according to an implementation.

As shown in FIG. 3B, the aerial vehicle-cable interface 330 may include movable members 332 to selectively couple to and decouple from one or more attachment points of the cable 110. Various example implementations of the aerial vehicle-cable interface are described herein with respect to FIGS. 3C-3I. While FIGS. 3C-3I illustrate various particular example implementations, other implementations of the aerial vehicle-cable interface are also possible, including variations and/or combinations of the implementations described herein FIG. 3C illustrates a schematic diagram of a first aerial vehicle-cable interface 330, according to an implementation, and FIG. 3G illustrates a schematic diagram of a first distal end 340 of a cable 110, according to an implementation. The first aerial vehicle-cable interface 330 may comprise movable members 332 actuated in a manner similar to a camera aperture. Accordingly, when actuated to couple to the cable 110 as shown in FIG. 3G, the movable members 332 may reduce the diameter of the opening at the aerial vehicle-cable interface 330 and thereby couple to attachment point 342 on cable 110. In analogous manner, when actuated to decouple from the cable 110 as shown in FIG. 3G, the movable members 332 may increase the diameter of the opening at the aerial vehicle-cable interface 330 and thereby decouple from attachment point 342 on cable 110. Further, the movable members 332 may be actuated using any suitable actuators, e.g., motors, solenoids, pneumatic actuators, hydraulic actuators, or other suitable actuators. In addition, one or more of the movable members 332 may include electrical contacts that interface with corresponding electrical contact surfaces on the cable, such that power may be transmitted from the power source 104 via the cable 110 to the aerial vehicle 300. While FIG. 3C shows a particular number, shape, size, and orientation of movable members 332, any number, shape, size, or orientation of the movable members 332 may be utilized to facilitate coupling to and decoupling from the cable 110.

Figure 3D:
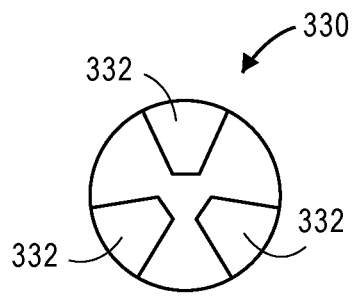
FIG. 3D is a schematic diagram of a second aerial vehicle-cable interface, according to an implementation.

FIG. 3D illustrates a schematic diagram of a second aerial vehicle-cable interface 330, according to an implementation. The second aerial vehicle-cable interface 330 may comprise movable members 332 actuated in a manner similar to a machine tool chuck. Accordingly, when actuated to couple to the cable 110 as shown in FIG. 3G, the movable members 332 may reduce the diameter of the opening at the aerial vehicle-cable interface 330 and thereby couple to attachment point 342 on cable 110. In analogous manner, when actuated to decouple from the cable 110 as shown in FIG. 3G, the movable members 332 may increase the diameter of the opening at the aerial vehicle-cable interface 330 and thereby decouple from attachment point 342 on cable 110. Further, the movable members 332 may be actuated using any suitable actuators, e.g., motors, solenoids, pneumatic actuators, hydraulic actuators, or other suitable actuators. In addition, one or more of the movable members 332 may include electrical contacts that interface with corresponding electrical contact surfaces on the cable, such that power may be transmitted from the power source 104 via the cable 110 to the aerial vehicle 300. While FIG. 3D shows a particular number, shape, size, and orientation of movable members 332, any number, shape, size, or orientation of the movable members 332 may be utilized to facilitate coupling to and decoupling from the cable 110.

Figure 3E:
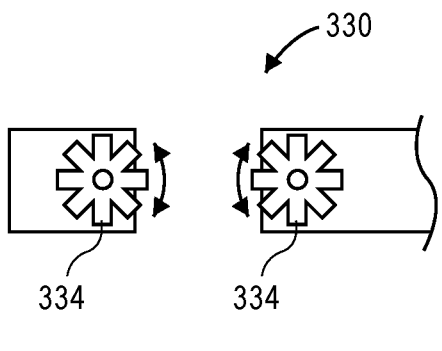
FIG. 3E is a schematic diagram of a third aerial vehicle-cable interface, according to an implementation.

FIG. 3E illustrates a schematic diagram of a third aerial vehicle-cable interface 330, according to an implementation. The third aerial vehicle-cable interface 330 may comprise movable toothed members or gears 334 that interface with the attachment point 342 of the cable 110. Although shown in FIG. 3E as substantially complete gears that can rotate in either direction, the movable toothed members 334 may include only a limited number or set of teeth, e.g., 1, 2, or 3 teeth adjacent to each other, or pairs (or other numbers) of teeth on opposing sides of the movable toothed members 334. In addition, the movable toothed members 334 may have limited rotational travel, e.g., between one or more engaged/locked positions and one or more disengaged/unlocked positions. Further, the movable toothed members 334 may be actuated using any suitable actuators, e.g., motors, solenoids, pneumatic actuators, hydraulic actuators, or other suitable actuators. Accordingly, when actuated to couple to the cable 110 as shown in FIG. 3G, the movable toothed members 334 may rotate in a direction to engage with the attachment point 342 of the cable 110 and lock in place. In analogous manner, when actuated to decouple from the cable 110 as shown in FIG. 3G, the movable toothed members 334 may rotate in the same direction or in an opposite direction to disengage from the attachment point 342. In addition, one or more of the movable toothed members 334 may include electrical contacts that interface with corresponding electrical contact surfaces on the cable, such that power may be transmitted from the power source 104 via the cable 110 to the aerial vehicle 300. While FIG. 3E shows a particular number, shape, size, and orientation of movable toothed members 334, any number, shape, size, or orientation of the movable toothed members 334 may be utilized to facilitate coupling to, moving along, and/or decoupling from the cable 110.

Figure 3F:
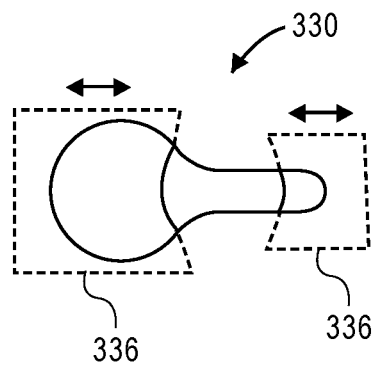
FIG. 3F is a schematic diagram of a fourth aerial vehicle-cable interface, according to an implementation.
Figure 3G:
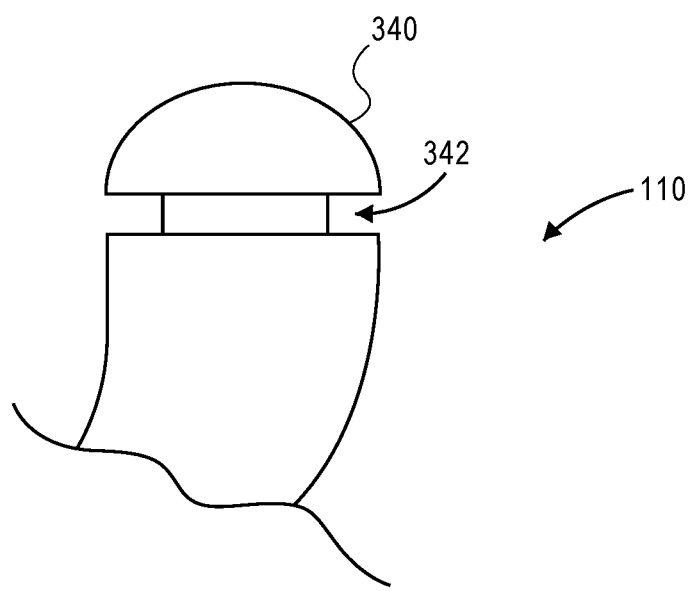
FIG. 3G is a schematic diagram of a first distal end of a cable, according to an implementation.

FIG. 3F illustrates a schematic diagram of a fourth aerial vehicle-cable interface 330, according to an implementation. The fourth aerial vehicle-cable interface 330 may comprise an opening shaped like a keyhole and movable members 336 that interface with the attachment point 342 of the cable 110. Accordingly, when actuated to couple to the cable 110 as shown in FIG. 3G, the movable members 336 may move the attachment point 342 towards the reduced diameter section of the keyhole and thereby couple to attachment point 342 on cable 110. In analogous manner, when actuated to decouple from the cable 110 as shown in FIG. 3G, the movable members 336 may move the attachment point 342 towards the increased diameter section of the keyhole and thereby decouple from attachment point 342 on cable 110. Further, the movable members 336 may be actuated using any suitable actuators, e.g., motors, solenoids, pneumatic actuators, hydraulic actuators, or other suitable actuators. In addition, one or more of the movable members 336 and/or sections of the keyhole opening may include electrical contacts that interface with corresponding electrical contact surfaces on the cable, such that power may be transmitted from the power source 104 via the cable 110 to the aerial vehicle 300. While FIG. 3F shows a particular shape, size, and orientation of the keyhole and a particular number, shape, size, and orientation of movable members 336, any shape, size, or orientation of the keyhole and any number, shape, size, or orientation of the movable members 336 may be utilized to facilitate coupling to and decoupling from the cable 110.

In addition, the movable members 332, 336, and/or the movable toothed members 334 as described with respect to FIGS. 3C-3F may be spring-biased to a closed or locked position, such that the movable members 332, 336 or movable toothed members 334 may, upon reaching the attachment point 342, automatically couple to the attachment point 342. In this manner, any actuation associated with the movable members 332, 336 or movable toothed members 334 may be required only for decoupling from the attachment point 342. Alternatively, the movable members 332, 336 and/or the movable toothed members 334 may be spring-biased to an open or unlocked position, such that any actuation associated with the movable members 332, 336 or movable toothed members 334 may be required only for coupling to the attachment point 342. Accordingly, the movable members 332, 336 or movable toothed members 334 may, in the absence of any actuation, automatically decouple from the attachment point 342.

Referring to FIG. 3G, the distal end 340 of the cable 110 may include a domed or hemispherical shape to facilitate engagement with the aerial vehicle-cable interface 330 of the aerial vehicle 300. In other implementations, the distal end 340 of the cable 110 may include other shapes to facilitate engagement, e.g., a cone shape, or any other tapered shape.

In addition, while FIG. 3G shows the attachment point 342 as being an annular groove around the entire periphery of the cable 110, the annular groove may be formed over only a portion of or in multiple sections around the periphery of the cable 110. Further, instead of an annular groove, the attachment point 342 may be formed as an annular protrusion around the entire periphery or over only a portion of or in multiple sections around the periphery of the cable 110. In this example, the movable members 332, 336 and/or the movable toothed members 334 may be modified to engage with the annular protrusion instead of with the annular groove. In addition, the attachment point 342 may include electrical contact surfaces that interface with corresponding electrical contacts of one or more of the movable members 332, 336 and/or the movable toothed members 334, such that power may be transmitted from the power source 104 via the cable 110 to the aerial vehicle 300. Moreover, while FIG. 3G shows only one annular groove of a particular size and shape, any suitable number, size and/or shape of annular grooves and/or annular protrusions may be utilized to couple aerial vehicles to the cable.

Figure 3I:
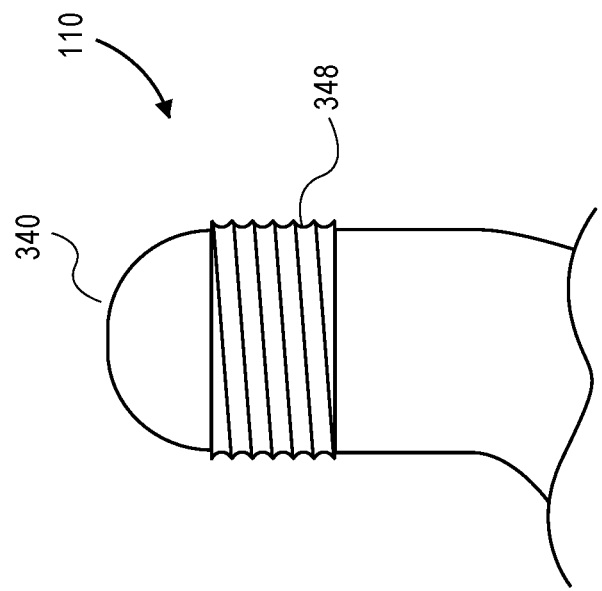
FIG. 3I is a schematic diagram of a second distal end of a cable, according to an implementation.
Figure 3H:
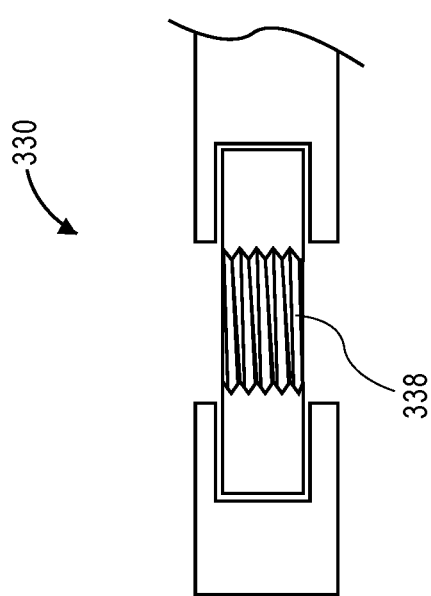
FIG. 3H is a schematic diagram of a fifth aerial vehicle-cable interface, according to an implementation.

FIG. 3H illustrates a schematic diagram of a fifth aerial vehicle-cable interface 330, according to an implementation, and FIG. 3I illustrates a schematic diagram of a second distal end 340 of a cable 110, according to an implementation. The fifth aerial vehicle-cable interface 330 may comprise a rotatable screw member 338 that interfaces with the attachment point 348 of the cable 110, as shown in FIG. 3I. For example, the rotatable screw member 338 may include internal threads that can mate with external threads provided at attachment point 348 of the cable 110. The rotatable screw member 338 may be actuated, in either clockwise or counterclockwise directions, using any suitable actuators, e.g., motors, solenoids, pneumatic actuators, hydraulic actuators, or other suitable actuators. Accordingly, when actuated to couple to the cable 110 as shown in FIG. 3I, the rotatable screw member 338 may rotate in a direction to engage the internal threads with the external threads at the attachment point 348 of the cable 110 and lock in place. In analogous manner, when actuated to decouple from the cable 110 as shown in FIG. 3I, the rotatable screw member 338 may rotate in the same direction or in an opposite direction to disengage the internal threads from the external threads at the attachment point 348. In addition, one or more sections of the rotatable screw member 338 may include electrical contacts that interface with corresponding electrical contact surfaces on the cable, such that power may be transmitted from the power source 104 via the cable 110 to the aerial vehicle 300. While FIG. 3H shows a particular angle, pitch, diameter, length, shape, handedness, and orientation of rotatable screw member 338, any angle, pitch, diameter, length, shape, handedness, or orientation of the rotatable screw member 338 may be utilized to facilitate coupling to and decoupling from the cable 110. Further, while FIG. 3H shows the internal threads of the rotatable screw member 338 running substantially continuously around the periphery of the interior surface, the internal threads may be formed only partially or in multiple sections around the periphery of the interior surface of the rotatable screw member 338.

Referring to FIG. 3I, the distal end 340 of the cable 110 may also include a domed or hemispherical shape to facilitate engagement with the aerial vehicle-cable interface 330 of the aerial vehicle 300. In other implementations, the distal end 340 of the cable 110 may include other shapes to facilitate engagement, e.g., a cone shape, or any other tapered shape. In addition, while FIG. 3I shows the external threads of the attachment point 348 running substantially continuously around the periphery of the exterior surface of the cable 110, the external threads may be formed only partially or in multiple sections around the periphery of the exterior surface of the attachment point 348. In this manner, one or more sections of the attachment point 348 may include electrical contact surfaces that interface with corresponding electrical contacts of the rotatable screw member 338, such that power may be transmitted from the power source 104 via the cable 110 to the aerial vehicle 300.

In addition, in some implementations, fuel, e.g., rocket fuel, may be transferred or pumped to one or more aerial vehicles 300 via the cable 110. A pump or other pressurizing mechanism may pump fuel from the vehicle 102 through the cable 110 to one or more aerial vehicles 300. The cable 110 may also include various pressurized stages and re-pressurizing mechanisms to continue to pump fuel along the length of the cable 110 toward the second, free end. The aerial vehicle-cable interfaces 330 of one or more aerial vehicles 300 may include corresponding interfaces to receive the fuel pumped via the cable 110. The one or more aerial vehicles 300 may provide the fuel directly to propulsion mechanisms to provide power, and/or may receive and store the fuel within an onboard power module, as described herein.

Further, in some implementations, one or both of the distal end 340 of the cable 110 (FIGS. 3G and 3I) and the aerial vehicle-cable interface 330 may include permanent magnets, electromagnets, and/or other magnetic components or elements to facilitate engagement and/or release. For example, if both the distal end 340 of the cable 110 and the aerial vehicle-cable interface 330 include permanent magnets, the magnets may be placed in a first orientation to facilitate engagement, e.g., using magnetic attraction, and the magnets may be placed in a second, different orientation to facilitate release, e.g., using magnetic repulsion. Likewise, if both the distal end 340 of the cable 110 and the aerial vehicle-cable interface 330 include electromagnets, the electromagnets may be energized in a first orientation to facilitate engagement, e.g., using magnetic attraction, and the electromagnets may be energized in a second, different orientation to facilitate release, e.g., using magnetic repulsion.

In other implementations, one or both of the distal end 340 of the cable 110 (FIGS. 3G and 3I) and the aerial vehicle-cable interface 330 may include springs or other resilient elements to facilitate release. For example, when coupling the distal end 340 of the cable 110 with the aerial vehicle-cable interface 330, a spring or other resilient element may be compressed or pressurized, such that the coupling results in stored potential energy in the spring or other resilient element. Then, upon decoupling the movable members 332, 336, and/or the movable toothed members 334 from the attachment point 342 of the cable 110, the spring or other resilient element may exert a force that separates the distal end 340 of the cable 110 from the aerial vehicle-cable interface 330, thereby facilitating release of the cable 110 from the aerial vehicle 300.

Moreover, in other implementations, the aerial vehicle-cable interface examples 330 described herein (FIGS. 3A-3F and 3H) may include connections that have an associated force threshold. For example, if the force applied to the aerial vehicle-cable interface exceeds a force threshold, the aerial vehicle-cable interface may be configured to automatically release its connection to the cable. In this manner, a final aerial vehicle may be automatically launched without requiring active actuation of the aerial vehicle-cable interface to release the connection to the cable. For example, a force threshold may be applied to the aerial vehicle-cable interface configurations described with respect to FIGS. 3E and 3F, in which the movable toothed members 334 (FIG. 3E) may rotate when a force exceeding the force threshold is applied, or in which the movable members 336 (FIG. 3F) are pushed toward the larger section of the keyhole opening when a force exceeding the force threshold is applied in the appropriate direction, thereby automatically releasing the respective connections to the cable.

In still other example implementations, the aerial vehicle-cable interface may also include a friction fit between the aerial vehicle and the cable. In this manner, when a force is applied that overcomes a frictional force threshold associated with the friction fit, the connection to the cable may be automatically released. For example, such a frictional force threshold may be applied to the aerial vehicle-cable interface configurations described with respect to FIGS. 3C and 3D, in which the movable members 332 may slide or slip off the cable when a force exceeding the frictional force threshold is applied, thereby automatically releasing the respective connections to the cable.

In still other implementations, any of the aerial vehicle-cable interface examples 330 described herein (FIGS. 3A-3F and 3H) may include a gimbal mechanism or other flexible or rotatable coupling mechanism such that the movable members 332, 336, the movable toothed members 334, and/or the rotatable screw member 338 may be rotatably or otherwise flexibly coupled to an attachment point 342, 348 of a cable 110. In addition to a gimbal mechanism having multiple arms rotatably connected to each other, a flexible coupling mechanism may include spherical bearing surfaces between portions of the aerial vehicle-cable interface 330 and its housing within the aerial vehicle 300, hinged connections between the aerial vehicle-cable interface 330 and its housing within the aerial vehicle 300, flexible or cantilevered connections between the aerial vehicle-cable interface 330 and its housing within the aerial vehicle 300, or other similar flexible, resilient, and/or rotatable connections.

Figure 4A:
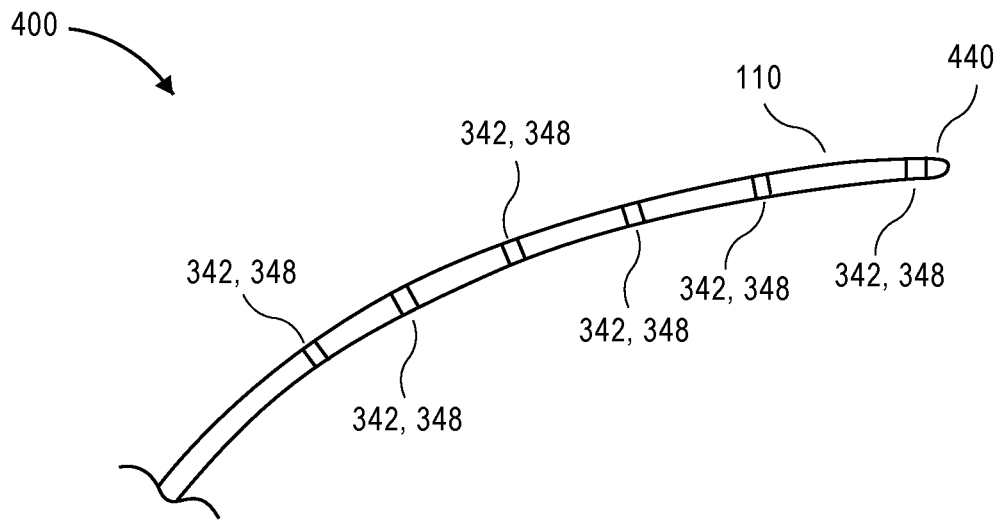
FIG. 4A is a schematic diagram of a portion of a cable, according to an implementation.

FIG. 4A illustrates a schematic diagram 400 of a portion of a cable 110, according to an implementation. The cable 110 may include multiple attachment points 342, 348 spaced along its length in addition to the attachment point 342, 348 at the distal end 340, as described with respect to FIGS. 3G and 3I. One or more aerial vehicles 300 may be coupled to the cable 110 at various attachment points 342, 348 along the length of the cable. In some implementations, the movable members 332, 336, the movable toothed members 334, and/or the rotatable screw members 338 may enable aerial vehicles 300 to couple to respective attachment points 342, 348, and after completing a launch sequence of a payload, one or more aerial vehicles 300 may decouple from the respective attachment points 342, 348, traverse or slide along the cable 110 to new, respective attachment points 342, 348, and then couple to the new, respective attachment points 342, 348, in order to being a new launch sequence.

In other implementations, the attachment points 342, 348 may be formed substantially continuously along the length of the cable to which aerial vehicles can couple. For example, referring again to FIG. 3G, the cable 110 may include attachment points formed substantially continuously along at least a portion of the length of the cable similar to attachment point 342, e.g., complete or partial annular grooves and/or annular protrusions. In this example, the movable toothed members 334 as shown in FIG. 3E may comprise substantially complete gears, such that the movable toothed members 334 may controllably move and position an aerial vehicle at almost any desired location along at least the portion of the length of the cable. Further, the movable members 332, 336 may enable aerial vehicles to be coupled at various desired locations along at least the portion of the length of the cable.

Likewise, referring again to FIG. 3I, the cable 110 may include external threads formed substantially continuously along at least a portion of the length of the cable similar to attachment point 348. In this example, the rotatable screw member 338 as shown in FIG. 3H may controllably move and position an aerial vehicle at almost any desired location along at least the portion of the length of the cable by rotation of the internal threads of the rotatable screw members 338 relative to the external threads of the attachment point 348.

Figure 4B:
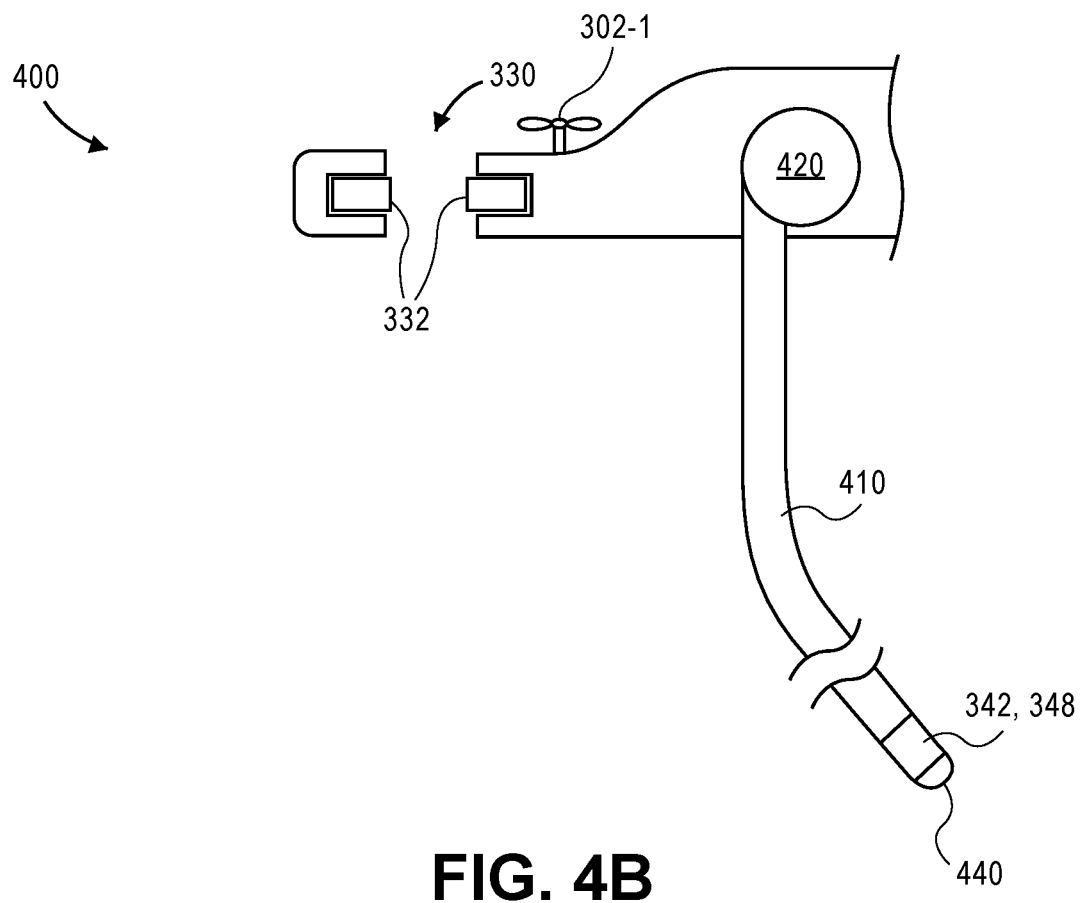
FIG. 4B is a schematic diagram of another portion of a cable, according to an implementation.

FIG. 4B illustrates a schematic diagram 400 of another portion of a cable 410, according to an implementation, shown in the context of a partial cross-sectional block diagram of the example aerial vehicle 300 of FIG. 3A, taken along line A-A in FIG. 3A, according to an implementation. In FIG. 4B, the propeller 302-1 and the aerial vehicle-cable interface 330 are shown, as previously described herein.

In the example of FIG. 4B, one or more aerial vehicles 300 may each carry a discrete cable section 410. The cable section 410 may have any suitable length and may include a distal end 440 having one or more attachment points 342, 348, as previously described herein with respect to FIGS. 3G, 3I, and 4A. The cable section 410 may be partially or completely retractable into the body of the aerial vehicle 300 by an aerial vehicle retraction mechanism 420.

In some implementations, a plurality of aerial vehicles 300 each carrying a retractable cable section 410 may be coupled together to form the cable 110 as illustrated in FIG. 1. For example, a first aerial vehicle may couple, via its aerial vehicle-cable interface 330, to the attachment point 342, 348 of the distal end 440 of a cable section 410 carried by a second aerial vehicle, the second aerial vehicle may couple, via its aerial vehicle-cable interface 330, to the attachment point 342, 348 of the distal end 440 of a cable section 410 carried by a third aerial vehicle, and so on. The distal end 440 of the cable section 410 carried by the aerial vehicle closest to the vehicle 102 may be coupled to the retraction mechanism 112 on the vehicle 102.

Alternatively, the cable 110 may be formed from a combination of the examples described with respect to FIGS. 4A and 4B. For example, a portion of the cable connected to the retraction mechanism 112 on the vehicle 102 may be formed similar to the cable 110 as described with respect to FIG. 4A. Further, additional portions of the cable 110, e.g., portions of the cable closer to the second, free end, may be formed of multiple discrete cable sections 410 carried by and joined together by respective aerial vehicles as described with respect to FIG. 4B.

In other implementations, alternatively to each aerial vehicle including an aerial vehicle-cable interface 330 as described herein, each aerial vehicle 300 may instead carry a tether that includes a structure at a distal end of the tether that is similar to the aerial vehicle-cable interface examples described herein with respect to FIGS. 3A-3I. In this manner, each aerial vehicle 300 may couple to the cable 110 by attaching the distal end of its tether to the cable 110. Further, as previously described herein, the attachment points of the cable and the distal ends of the tethers may include magnetic elements to facilitate coupling and/or decoupling. In addition, while the aerial vehicle-cable interface examples described herein are illustrated as closed structures, e.g., circular openings, the structures at the distal ends of the tethers in this example implementation may include open structures, e.g., approximately half-circular openings, that are otherwise similar to the aerial vehicle-cable interface examples described herein.

In still other implementations, one or more of the aerial vehicles 300 may be fixedly attached or coupled to the cable 110, such that the fixed aerial vehicle(s) 300 are not able to detach from the cable. In addition, the fixed aerial vehicle(s) 300 may or may not be able to move along the cable using any one or more of the example aerial vehicle-cable interfaces described herein. Further, even though one or more of the aerial vehicles 300 may be fixedly attached or coupled to the cable, the fixed aerial vehicle(s) 300 may include any (combination) of the features of the aerial vehicles described herein, including various configurations, sizes, propulsion mechanisms, fixed wings, reconfigurable components such as wings or propulsion mechanisms, payload retention mechanisms, control systems, etc.

In some implementations of the launch system 100 as shown and described with respect to FIGS. 2A-2E, a payload 122-8 and/or an aerial vehicle 120-8 carrying the payload 122-8 may be launched, according to the launch parameters, into low earth orbit at a speed exceeding the escape velocity from Earth, e.g., approximately 25,000 mph or 11.2 km/s from the surface of the Earth. For example, the launch system 100 may cause the payload 122-8 to reach speeds including and exceeding the escape velocity from Earth, such that the payload 122-8 may proceed along a launch path 127-1 and subsequently enter a low earth orbit.

An orbital path around the Earth is generally contained with a substantially flat plane, called an orbital plane. In addition, an orbital path around the Earth can be defined by three parameters: altitude, eccentricity, and inclination. Altitude is a measure of the distance of the orbital path from the surface of the Earth. For example, an object traveling on an orbital path at a lower altitude will have a higher orbital velocity than an object traveling on an orbital path at a higher altitude. Eccentricity is a measure of the elliptical shape of the orbital path. For example, an orbital path with eccentricity close to zero is approximately circular, and an orbital path with eccentricity close to one is highly elliptical. Inclination is a measure of the angle of the orbital plane relative to the Earth's equator. An orbital path with zero degrees inclination is approximately coplanar with the Earth's equator, and an orbital path with 90 degrees inclination traverses approximately over or near both the geographic north and south poles and is also called a polar orbit. In addition, the point along an orbital path that is closest to the Earth is called perigee, and the point along an orbital path that is farthest from the Earth is called apogee. Furthermore, the time it takes an object to traverse an orbital path once is called a period.

Low earth orbit (LEO) is an orbital path around the Earth at altitudes between approximately 160 km (approximately 99 miles) and approximately 2000 km (approximately 1200 miles). The orbital velocity needed to maintain LEO is approximately 7.8 km/s, but this orbital velocity decreases with increased orbital altitude. The period of an orbital path in LEO is approximately 90 minutes. High earth, geosynchronous, or geostationary orbits (GEO) are orbital paths around the Earth at altitudes of approximately 35,780 km (approximately 22,200 miles). GEOs generally have low inclination and have a period of approximately 24 hours, such that they tend to remain over the same portion of the Earth as the Earth rotates. Orbital paths around the Earth at altitudes between LEO and GEO, e.g., between approximately 2000 km and approximately 35,780 km, are generally referred to as medium earth orbits (MEO).

In some implementations, after completing the launch process using the launch system 100 to launch a payload 122-8 into LEO, the orbital path of the payload 122-8 may be altered from LEO to GEO. One method of changing the orbital path of an object from LEO to GEO is called the Hohmann Transfer. In this method, an object traveling on a first orbital path in LEO may increase its orbital velocity at a first point on the first orbital path. An appropriate increase in orbital velocity, e.g., an increase of approximately 1.2 km/s, may cause the object to now travel on a different orbital path, e.g., called a transfer orbit, that may have high eccentricity, e.g., be highly elliptical, and that traverses both the first point on the first orbital path and a second point, e.g., apogee, on a second orbital path at higher altitude, e.g., at GEO. When the object traveling on the transfer orbit reaches the second point, the object may again increase its orbital velocity at the second point. An appropriate increase in orbital velocity, e.g., an increase of approximately 1.2 km/s, may cause the object to now travel on the second orbital path at GEO. This process can be performed with different increases in orbital velocity and/or repeated multiple times to reach higher altitude orbits, and this process can also be reversed by reducing the orbital velocities at appropriate points on the orbital paths to reach lower altitude orbits.

In some implementations, the payload 122-8 and/or the aerial vehicle 120-8 carrying the payload 122-8 that has been launched may not have enough reserve power, e.g., in a power module or power reserve or backup, to effect the total increase in orbital velocity, e.g., an increase of approximately 2.4 km/s, needed to transfer its orbit from one orbital path at a lower altitude to another orbital path at a higher altitude, e.g., from LEO to GEO. Another method of imparting the desired changes in orbital velocity needed to transfer a payload from one orbital path to another may include the use of an orbital transfer system, as described below.

Figure 5:
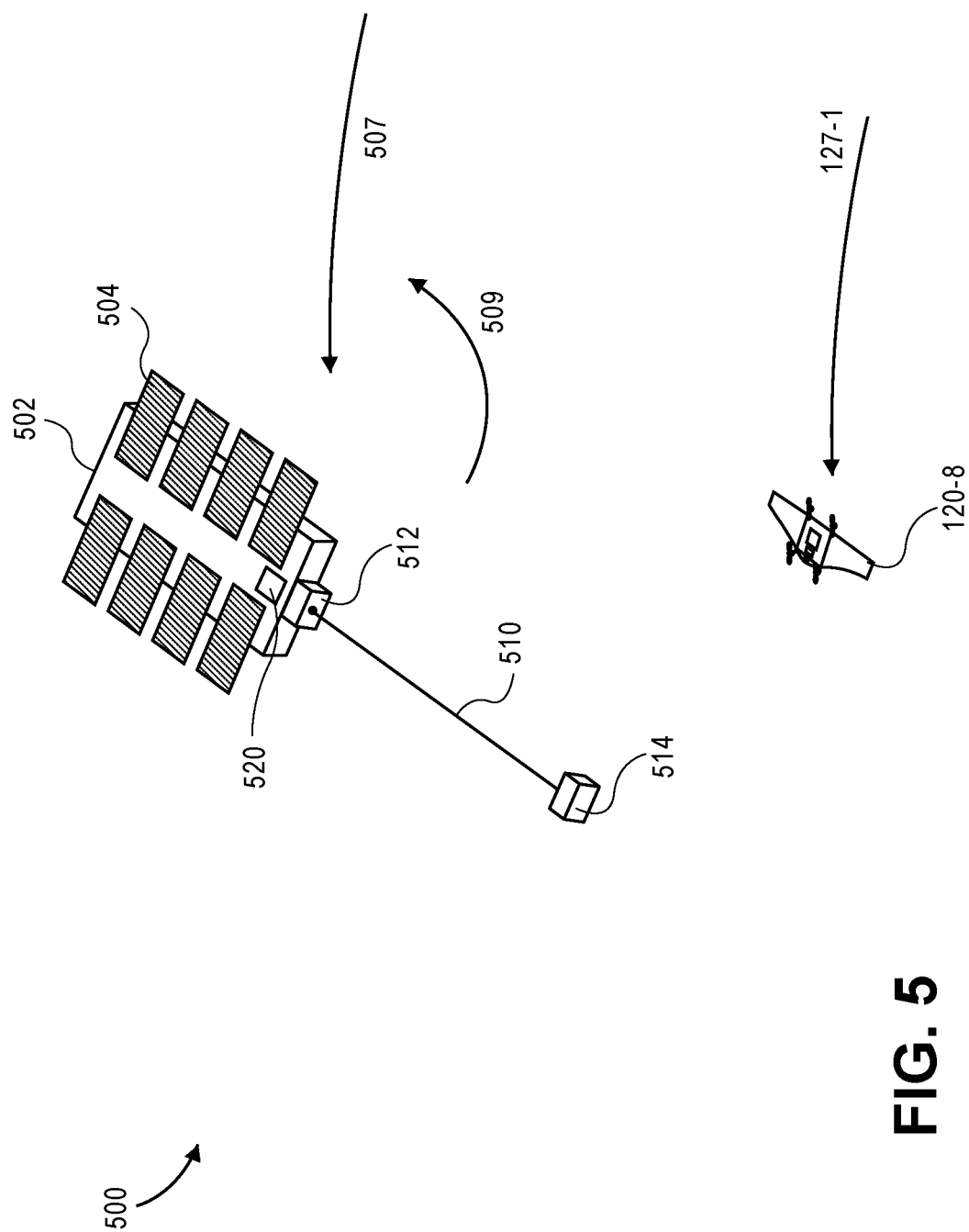
FIG. 5 is a schematic diagram of an orbital transfer system, according to an implementation.

FIG. 5 illustrates a schematic diagram of an orbital transfer system 500, according to an implementation. The orbital transfer system 500 may include a platform 502 having one or more power sources 504, e.g., addressable solar panel arrays, one or more propulsion mechanism(s) (not shown), and an orbital transfer control system 520. In addition, the orbital transfer system 500 may include a tether 510 coupled to a tether retraction mechanism 512 attached to the platform 502 at one end and having a grasping mechanism 514 at the opposite end.

The orbital transfer system 500 may be maintained in orbit, e.g., in LEO, in order to transfer payloads from one orbital path to another. As such, the orbital transfer system 500 may travel along an orbital path 507 and, at its perigee, may couple to payloads to be transferred to higher orbit. In addition, the orbital transfer system 500 may rotate about its center of mass in the direction of arrow 509 in order to increase the altitude and orbital velocity of coupled payloads.

The platform 502 may include any operation, routing, navigation, and/or communication components needed to maintain the orbital transfer system in orbit, e.g., in LEO, and to facilitate transferring payloads from one orbital path to another. In addition, the mass of the platform 502 and/or other movable components of the orbital transfer system 500 may act as counterweights to balance the mass of and/or accelerate any payloads to be transferred by the orbital transfer system 500.

The power sources 504 may provide power to the various components of the orbital transfer system 500, including for communication, routing, navigation, operation of the propulsion mechanism(s), operation of the tether retraction mechanism 512, operation of the grasping mechanism 514, and any other operations of the orbital transfer system 500.

The tether 510 may be a high-strength fiber having a length of approximately 100 km. The tether 510 may be extendible and retractable by the tether retraction mechanism 512 in order to rendezvous with and couple to an aerial vehicle 120-8 traveling along a launch path 127-1, e.g., at LEO, and to release the aerial vehicle 120-8 along a new orbital path. In addition, the grasping mechanism may be any suitable type of grasping mechanism for coupling and decoupling the end of the tether 510 and a payload, e.g., aerial vehicle 120-8. For example, the grasping mechanism may couple with the aerial vehicle-cable interface 330 of an aerial vehicle 300 as described herein with respect to FIGS. 3A-3I, or the grasping mechanism may couple with any other structure or component of the aerial vehicle 300.

The orbital transfer control system 520 may communicate (via wired or wireless communication) with the tether retraction mechanism 512, the grasping mechanism 514, the propulsion mechanism(s) (not shown) of the orbital transfer system 500, and/or the aerial vehicle 120-8 or payload to be transferred to higher orbit in order to receive and/or transmit data and information regarding their operation. For example, the orbital transfer control system 520 may transmit instructions to each of the tether retraction mechanism 512, the grasping mechanism 514, the propulsion mechanism(s) (not shown) of the orbital transfer system 500, and/or the aerial vehicle 120-8 or payload to be transferred to higher orbit in order to rendezvous with the aerial vehicle 120-8 or payload, couple to the aerial vehicle 120-8 or payload, increase an orbital velocity of the aerial vehicle 120-8 or payload, release the aerial vehicle 120-8 or payload along a new orbital path, and modify its own operation following release to maintain or return to the orbital path 507 of the orbital transfer system 500. As discussed in further detail with respect to FIG. 12, the launch control system 130 may control at least the operation, routing, navigation, and communication by and among the orbital transfer system 500 and the aerial vehicle 120-8 or payload to be transferred to higher orbit.

Figure 6A:
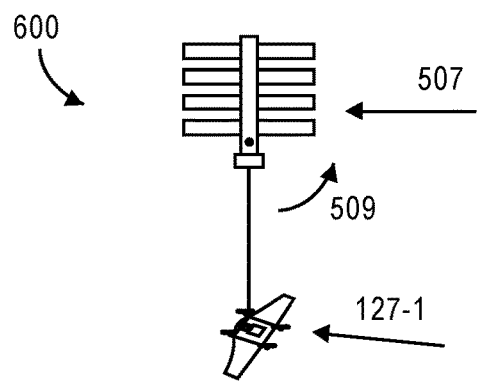
FIG. 6A is a schematic diagram of an initial configuration of an orbital transfer process, according to an implementation.
Figure 6B:
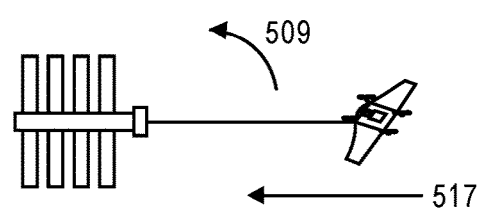
FIG. 6B is a schematic diagram of an intermediate configuration of an orbital transfer process, according to an implementation.
Figure 6C:
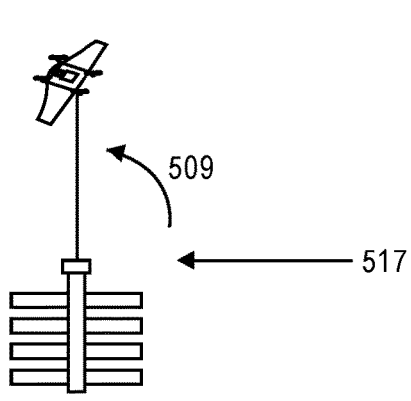
FIG. 6C is a schematic diagram of another intermediate configuration of an orbital transfer process, according to an implementation.
Figure 6D:
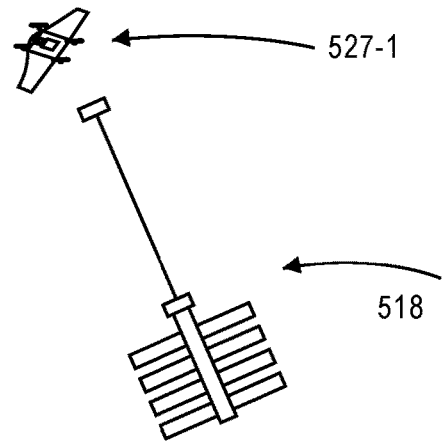
FIG. 6D is a schematic diagram of a final configuration of an orbital transfer process, according to an implementation.

FIGS. 6A-6D illustrate a sequence of schematic diagrams of an orbital transfer process 600, according to an implementation. FIG. 6A illustrates a schematic diagram of an initial configuration of the orbital transfer process 600, FIGS. 6B and 6C illustrate schematic diagrams of intermediate configurations of the orbital transfer process 600, and FIG. 6D illustrates a schematic diagram of a final configuration of the orbital transfer process 600.

Referring to FIG. 6A, the orbital transfer system 500 may travel along its orbital path 507 with a rotational motion in the direction of arrow 509 about its center of mass. In addition, a payload may travel along its orbital path 127-1 following a launch process using launch system 100. The orbits of the orbital transfer system 500 and the payload may be coordinated such that when the orbital transfer system 500 reaches perigee along its orbital path 507, the payload and the orbital transfer system 500 may meet at a rendezvous point with the tether 510 extending in the direction of the payload. At the rendezvous point, the tether retraction mechanism 512 and/or the grasping mechanism 514 of the orbital transfer system 500 may be operated to couple with the payload.

Referring to FIG. 6B, upon successful coupling between the payload and the orbital transfer system 500, the orbital path of the coupled payload and orbital transfer system 500 may be altered to orbital path 517 due to their combined masses and velocities. In addition, the rotational motion of the orbital transfer system 500 may cause the payload to be rotated in the direction of arrow 509 about the combined center of mass of the coupled payload and orbital transfer system 500. During rotation of the payload by the orbital transfer system 500, the tether retraction mechanism 512 may alter the tether length as desired in order to transfer the payload to a desired higher orbit. Referring to FIG. 6C, with continued rotation of the payload in the direction of arrow 509 about the combined center of mass of the coupled payload and orbital transfer system 500, the payload may reach a release point at a higher (or highest) altitude while still coupled to the orbital transfer system 500.

Referring to FIG. 6D, upon the payload reaching a release point, the tether retraction mechanism 512 and/or the grasping mechanism 514 of the orbital transfer system 500 may be operated to decouple from the payload. As a result of the rotational motion and additional momentum imparted to the payload by the orbital transfer system 500, the orbital velocity of the released payload may be increased in order to transfer the payload to a new orbital path 527-1, e.g., a transfer orbit. Although the sequence of FIGS. 6A-6D illustrates approximately a half rotation of the orbital transfer system 500 prior to releasing the payload, the coupled orbital transfer system 500 and payload may rotate together any other amount or as many times as desired in order to reach the desired release velocity and/or the desired release point associated with the new orbital path 527-1.

When the payload reaches apogee, or other desired point, of the new orbital path 527-1, the payload may again increase its velocity in order to travel along a final, desired orbital path, e.g., GEO. Alternatively, if the payload does not have sufficient onboard power to effect the required increase in velocity, a second orbital transfer system 500 may rendezvous with the payload at the apogee of the new orbital path 527-1, and repeat the process described herein to transfer the payload to the final, desired orbital path, e.g., GEO.

In addition, referring again to FIG. 6D, as a result of imparting some of its momentum to the payload, the orbital velocity of the orbital transfer system 500 may be decreased, resulting in a new orbital path 518 of the orbital transfer system 500. Thereafter, various propulsion mechanism(s) (not shown) or other components of the orbital transfer system 500 may be operated in order to return the orbital transfer system back to its intended orbital path 507 in preparation for further transfers of payloads.

While the description of FIGS. 5-6D have focused on transferring payloads from lower orbit to higher orbit, e.g., from LEO to GEO, the orbital transfer system 500 may also be operated to transfer payloads in the reverse direction, e.g., from higher orbit to lower orbit. In addition, multiple orbital transfer systems 500 may be used in sequence in order to transfer payloads to various desired orbital paths, e.g., to reach intermediate altitude orbits within MEO, or to reach higher altitude orbits beyond GEO.

Figure 7:
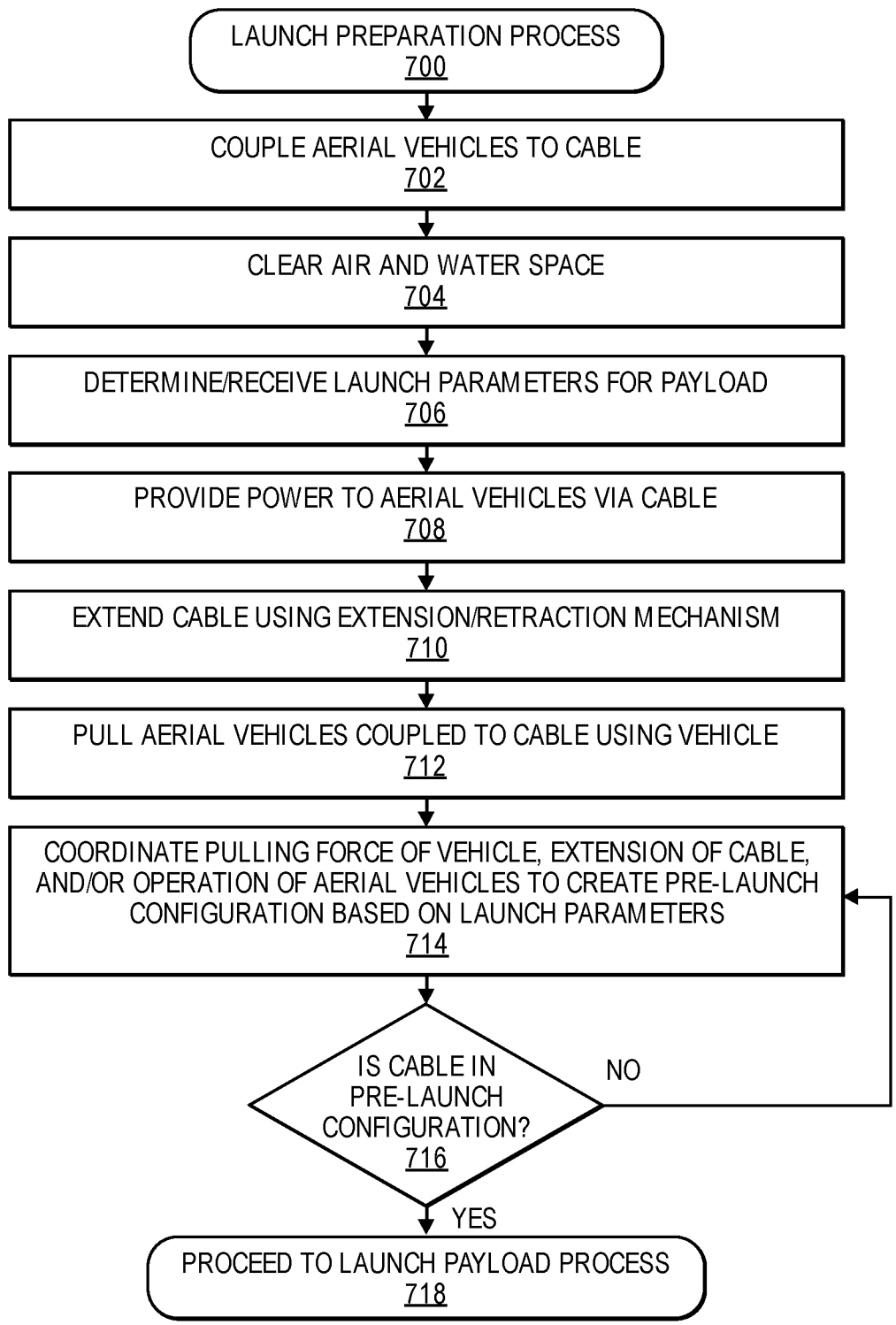
FIG. 7 is a flow diagram illustrating an example launch preparation process, according to an implementation.

FIG. 7 is a flow diagram illustrating an example launch preparation process 700, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 700 begins by coupling one or more aerial vehicles to the cable, as in 702. In some implementations with shorter cable lengths, for example, only one aerial vehicle having a payload may be coupled to the second, free end of the cable. In other implementations, a plurality of aerial vehicles may be spaced along and coupled to the cable. The plurality of aerial vehicles may have different sizes, configurations, and/or propulsion mechanisms depending on their coupling location along the cable. For example, aerial vehicles closer to the retraction mechanism and the vehicle may be configured as larger, propeller-based aerial vehicles, whereas aerial vehicles closer to the second, free end of the cable may be configured as smaller, fixed-wing aerial vehicles having jet engines. Any suitable number and combination of aerial vehicles may be coupled to the cable, such that a waveform may be introduced and propagated along the cable to launch a payload.

In addition, the process 700 may include clearing the air and water space to be traversed by the vehicle, cable, and/or the aerial vehicles, as in 704. For example, the air space (with an associated safety margin) through which the aerial vehicles are expected to navigate may be cleared of other aircraft prior to initiating a launch sequence. In addition, if the vehicle is a marine vessel, the water space (with an associated safety margin) under the cleared air space may be cleared of other vessels prior to initiating a launch sequence. The cleared air and water space may extend behind the vehicle, as well as in front of the vehicle, particularly if the cable is allowed to fall into the water space after completing a launch sequence. If the vehicle is instead a land-based vehicle, a ground space (with an associated safety margin) under the cleared air space may be similarly cleared of other land-based vehicles.

Launch parameters for the payload may then be received and/or determined, as in 706. The launch parameters may include a destination, a distance, a speed, a trajectory, an altitude, an eccentricity, an inclination, a mass or weight, other payload characteristics, wind speed or direction, other environmental factors, vehicle speed or acceleration, cable length, diameter, or flexibility, cable retraction force, speed, or acceleration, aerial vehicle operational characteristics, or any other factors that may be considered in determining the characteristics of the launch process in order to launch the payload. For example, if a payload is to be launched into low earth orbit, the launch parameters may include the required launch speed (at least as great as the escape velocity from the Earth), the intended altitude, eccentricity, and inclination of the low earth orbit, while taking into account environmental factors and physical characteristics of the launch system and payload.

Based on the determinations from the launch parameters, power may be provided to the aerial vehicles via the cable, as in 708, the cable may be extended using the retraction mechanism, as in 710, and the vehicle may pull the aerial vehicles coupled to the cable, as in 712. For example, based on the launch parameters, the vehicle, retraction mechanism, and/or the aerial vehicles may be operated to prepare the payload for launch. The cable may be extended to the desired length for launch, the aerial vehicles may be operated to form a desired shape of the cable, and the vehicle may pull the aerial vehicles coupled to the cable to position the entire launch system for launch within the cleared air and water space.

The pulling force of the vehicle, the extension of the cable, and/or the operation of the aerial vehicles may be coordinated, as in 714, to create the pre-launch configuration based on the launch parameters. For example, as shown and described with respect to FIG. 2A, the cable may be extended to the desired length, the aerial vehicle may be operated to form a desired shape of the cable, and the vehicle may position the launch system within the cleared air and water space.

If it is determined, at 716, that the cable (and entire launch system) is not yet in the pre-launch configuration, the process 700 may return to 714 to continue to coordinate the operations of the vehicle, retraction mechanism, and/or aerial vehicles to create the pre-launch configuration. If it is determined, at 716, that the cable (and entire launch system) is in the correct pre-launch configuration, the process 700 may proceed to the launch payload process, as in 718, as described with respect to FIG. 8.

Figure 8:
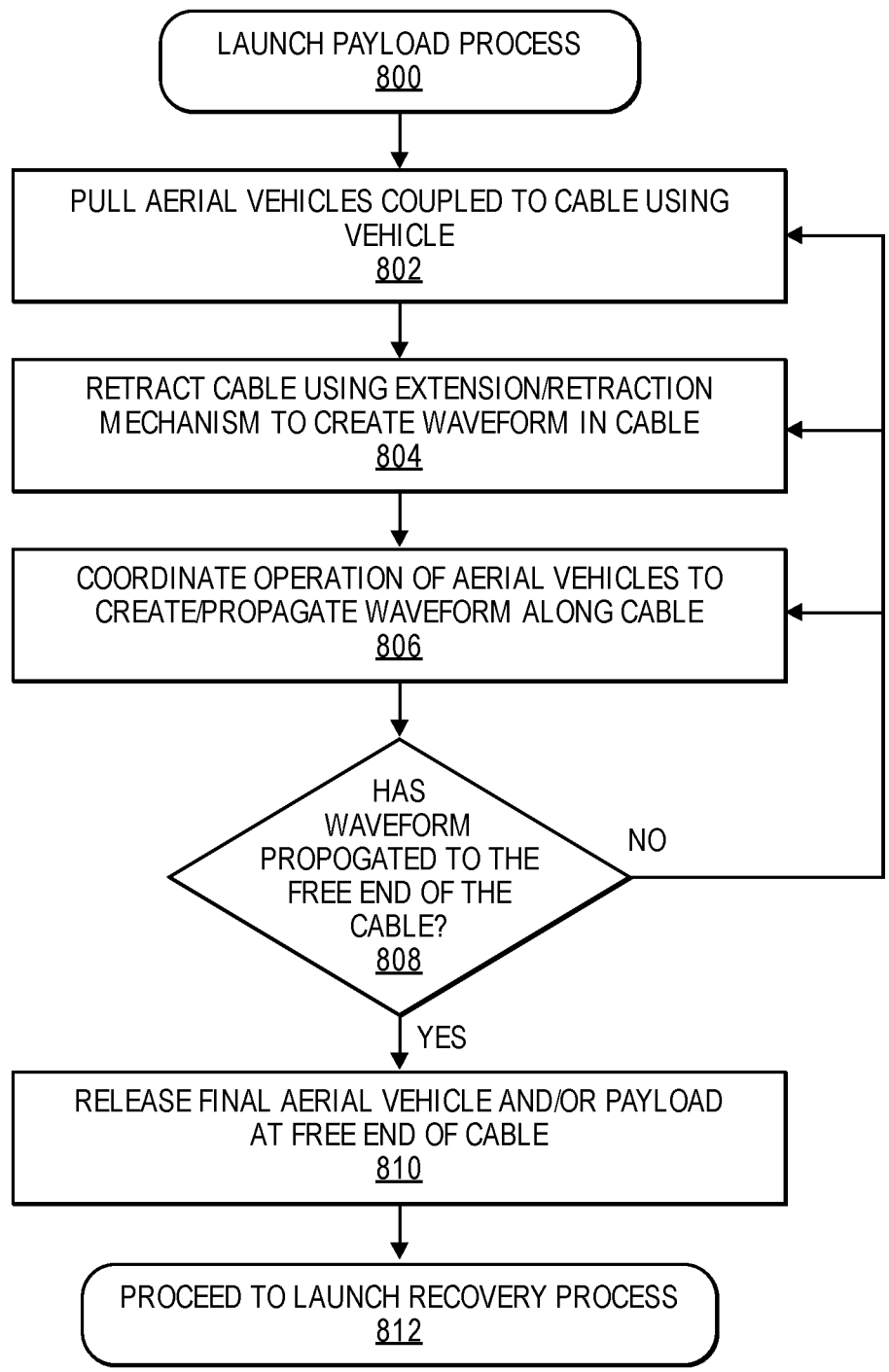
FIG. 8 is a flow diagram illustrating an example launch payload process, according to an implementation.

FIG. 8 is a flow diagram illustrating an example launch payload process 800, according to an implementation. The example process 800 begins by pulling the aerial vehicles coupled to the cable using the vehicle, as in 802, retracting the cable using the retraction mechanism to create a waveform in the cable, as in 804, and/or coordinating the operation of the aerial vehicles to create and/or propagate the waveform along the cable, as in 806, in order to launch the payload based on the determined and/or received launch parameters. The pulling by the vehicle may provide an initial or baseline velocity and/or acceleration to the entire launch system to launch the payload. The retracting of the cable may cause a waveform to be created in the cable, and/or provide additional velocity and/or acceleration to the cable to launch the payload. Further, the operation of the aerial vehicles may cause a waveform to be created in the cable, cause the waveform to propagate along the cable, and/or provide additional velocity and/or acceleration to the cable as the waveform propagates toward the second, free end of the cable to launch the payload.

If it is determined, as in 808, that the waveform has not yet propagated to the second, free end of the cable to launch the payload, then the process 800 may return to one or more of boxes 802, 804, 806 to continue the coordinated operation of the pulling by the vehicle, the retracting of the cable, and/or the operation of the aerial vehicles to cause the waveform to continue to propagate and accelerate toward the second, free end of the cable in accordance with the determined and/or received launch parameters.

If it is determined, as in 808, that the waveform has reached the second, free end of the cable, then the process 800 may proceed to release the final aerial vehicle and/or the payload at the second, free end of the cable, as in 810, thereby launching the payload in accordance with the determined and/or received launch parameters. As described herein, the launch process may launch the final aerial vehicle with the payload or only the payload from the final aerial vehicle. Alternatively, the final aerial vehicle may be the payload itself. Further, any of the aerial vehicle-cable interface examples and/or payload retention examples described herein with respect to FIGS. 3A-4B may be used by the launch system to launch the payload. Thereafter, the process 800 proceeds to the launch recovery process, as in 812, as described with respect to FIG. 9.

Figure 9:
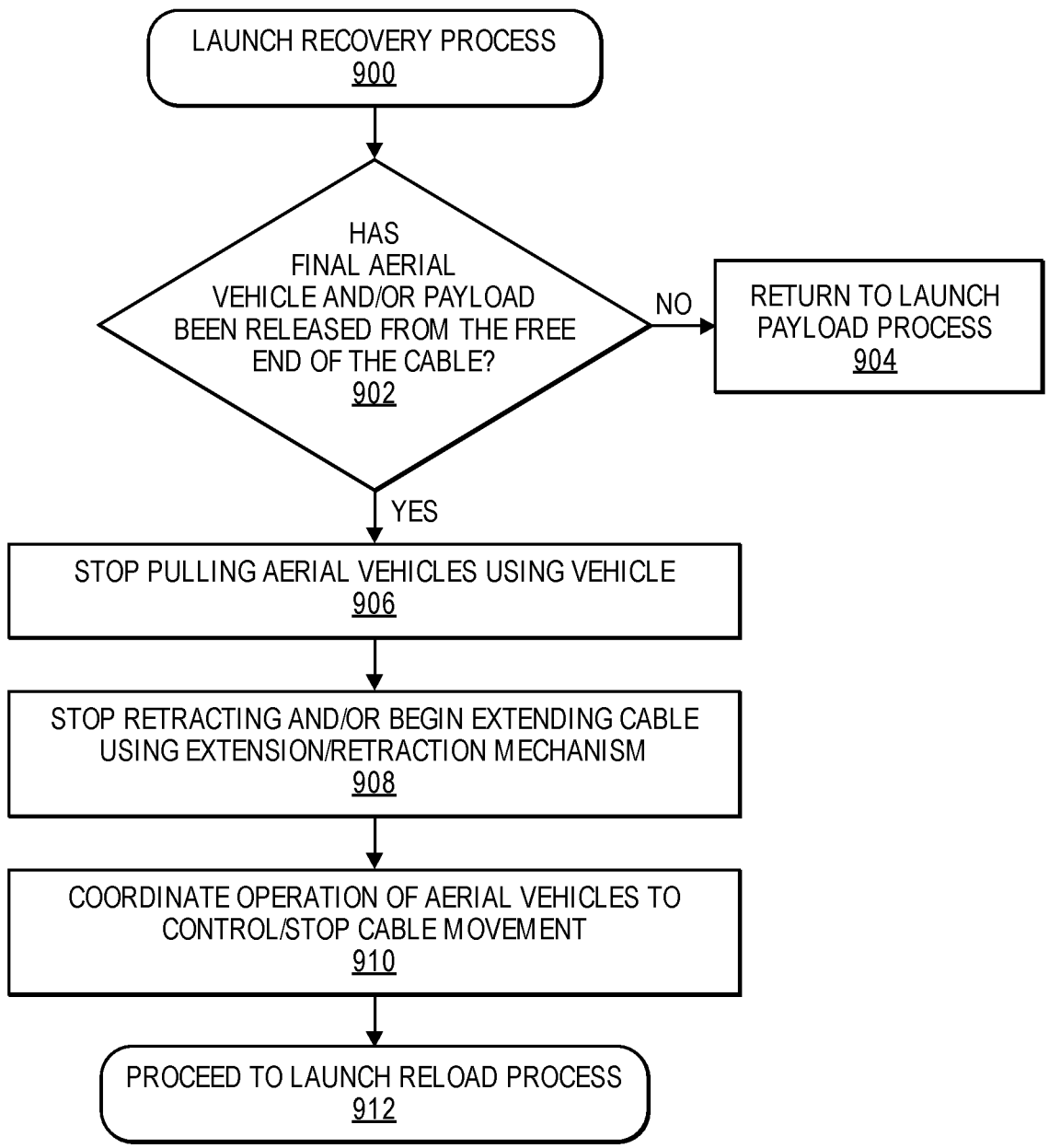
FIG. 9 is a flow diagram illustrating an example launch recovery process, according to an implementation.

FIG. 9 is a flow diagram illustrating an example launch recovery process 900, according to an implementation. The example process 900 begins by determining whether the final aerial vehicle and/or the payload has been released from the second, free end of the cable, as in 902. If not, the process 900 returns to the launch payload process, as in 904, as described herein with respect to FIG. 8. If the final aerial vehicle and/or the payload has been released from the second, free end of the cable, then process 900 proceeds to stop pulling the aerial vehicles using the vehicle, as in 906, stop retracting and/or begin extending the cable using the extension/retraction mechanism, as in 908, and/or coordinate operation of the aerial vehicles to control and/or stop the cable movement, as in 910. By stopping the pulling of the aerial vehicles by the vehicle, stopping retraction of the cable and/or beginning extension of the cable, and/or by operating the aerial vehicles to control and/or stop the cable movement, the velocity and/or acceleration of the cable and the entire launch system may be reduced, such that the launch system may be controlled and prepared for further operations.

Alternatively, as described herein, the cable may not be controlled by the aerial vehicles and may be allowed to fall into the cleared water (or land) space. In this example, the vehicle may stop pulling the aerial vehicles, and/or the retraction mechanism may stop retraction of the cable and/or begin extension of the cable. In addition, the aerial vehicles may decouple from the cable following completion of the launch process, and/or may sequentially decouple from the cable as the waveform propagates along the cable toward the second, free end. Thereafter, the retraction mechanism may retract the fallen cable back to the vehicle to begin preparations for further operations.

Figure 10:
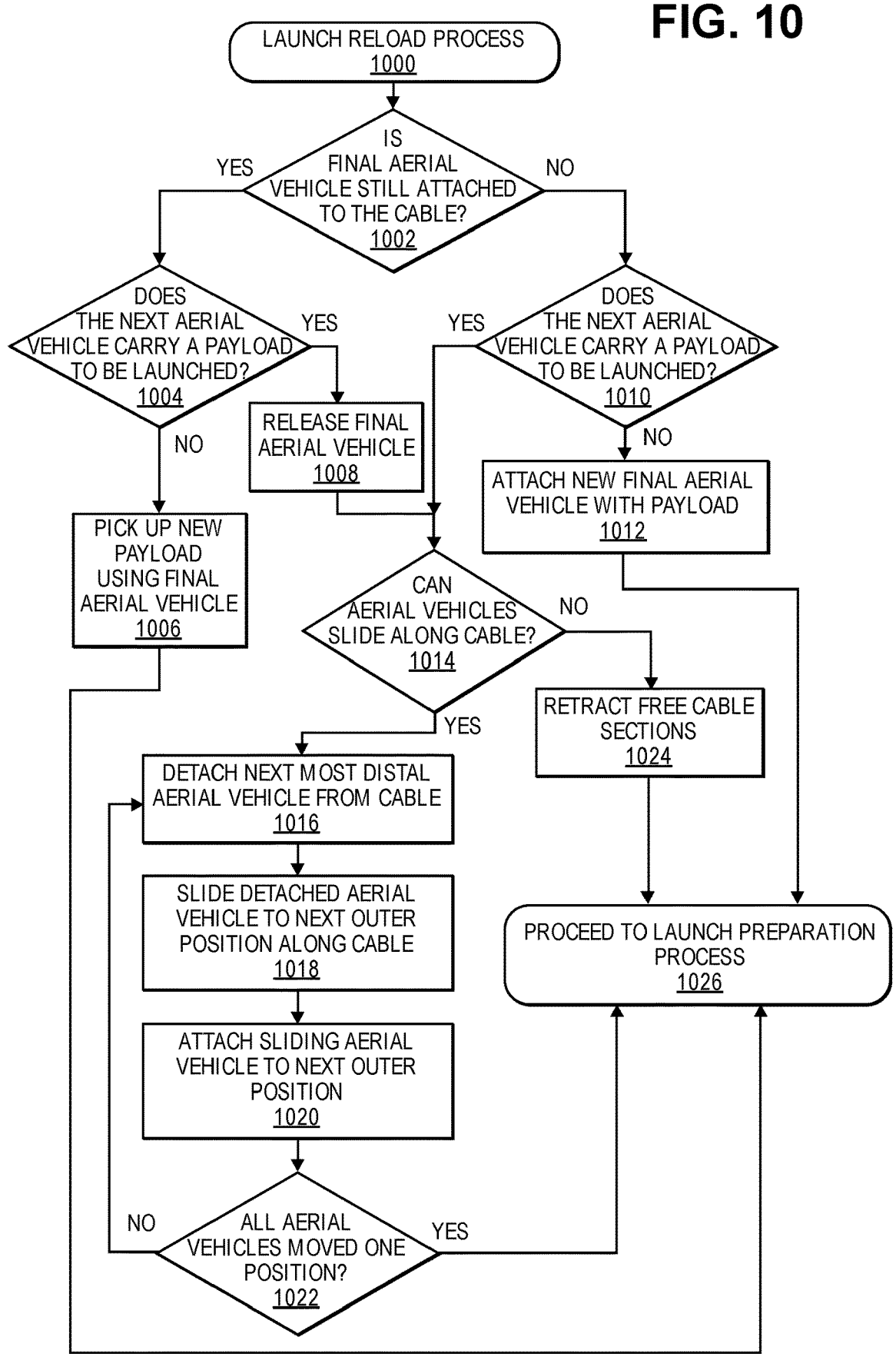
FIG. 10 is a flow diagram illustrating an example launch reload process, according to an implementation.

Upon regaining and/or maintaining control of the vehicle, cable, and/or aerial vehicles following completion of the launch process, the process 900 may proceed to the launch reload process, as in 912, as described herein with respect to FIG. 10.

FIG. 10 is a flow diagram illustrating an example launch reload process 1000, according to an implementation. The example process 1000 begins by determining whether the final aerial vehicle is still coupled to the second, free end of the cable, as in 1002. If the final aerial vehicle is still coupled to the second, free end of the cable following launch of the payload, then the process 1000 proceeds to determine whether the next aerial vehicle coupled closest to the second, free end of the cable carries a payload to be launched, as in 1004. If the next aerial vehicle does carry a payload to be launched, then the process 1000 releases the final aerial vehicle from the cable, as in 1008, and then proceeds to box 1014, as will be described below.

If, however, the next aerial vehicle does not carry a payload to be launched, then the process 1000 proceeds to pick up a new payload using the final aerial vehicle, as in 1006. In some implementations, this example process flow determines that only the final aerial vehicle coupled to the second, free end of the cable carries payloads to be launched, and the final aerial vehicle is reloaded following completion of each launch process to carry a new payload to be launched. Other aerial vehicles coupled to the cable may be primarily tasked with and configured for propagating and accelerating the waveform along the cable, while only the final aerial vehicle may have the additional task of and be configured for carrying and launching payloads.

In order to pick up a new payload using the final aerial vehicle, as in 1006, the final aerial vehicle may navigate to any suitable location to acquire a new payload. For example, the final aerial vehicle may navigate back to the vehicle to pick up a new payload, may navigate proximate to a second aerial vehicle (not coupled to the cable) that is tasked with delivering a new payload to the final aerial vehicle and receive the new payload from the second aerial vehicle, or may navigate to another location, such as an aerial fulfillment center, to receive or pick up a new payload. The transfer of the new payload to the final aerial vehicle may include automatic and/or manual processes. In addition, any of the payload retention examples described herein with respect to FIGS. 3A-3B may be used by the launch system to reload the final aerial vehicle with the new payload.

Following successful reloading of the new payload to the final aerial vehicle, the process 1000 proceeds to the launch preparation process, as in 1026, as described herein with respect to FIG. 7.

Returning to box 1002, if it is determined that the final aerial vehicle is not still coupled to the second, free end of the cable following launch of the payload, then the process 1000 proceeds to determine whether the next aerial vehicle coupled closest to the second, free end of the cable carries a payload to be launched, as in 1010. If the next aerial vehicle does carry a payload to be launched, then the process 1000 proceeds to box 1014, as will be described below.

If the next aerial vehicle does not carry a payload to be launched, then the process 1000 proceeds to couple a new final aerial vehicle carrying a new payload to be launched, as in 1012. In some implementations, this example process flow determines that only the final aerial vehicle coupled to the second, free end of the cable carries payloads to be launched, the final aerial vehicle is launched with the payload or is the payload itself, and a new final aerial vehicle is reloaded to the second, free end of the cable following completion of each launch process. Other aerial vehicles coupled to the cable may be primarily tasked with and configured for propagating and accelerating the waveform along the cable, while only the final aerial vehicles may have the additional task of and be configured for carrying and launching payloads.

In order to couple a new final aerial vehicle carrying a new payload to be launched, as in 1012, the other aerial vehicles coupled to the cable may navigate to any suitable location to acquire a new final aerial vehicle. For example, the other aerial vehicles may navigate back to the vehicle to acquire a new final aerial vehicle, may navigate proximate to a new final aerial vehicle (not already coupled to the cable) that carries a new payload and that couples to the cable, or may navigate to another location, such as an aerial fulfillment center, to acquire a new final aerial vehicle. The coupling of the new final aerial vehicle carrying a new payload may include automatic and/or manual processes. In addition, any of the aerial vehicle-cable interface examples described herein with respect to FIGS. 3A-4B may be used by the launch system to couple a new final aerial vehicle with a new payload to the second, free end of the cable.

Following successful coupling of the new final aerial vehicle with the new payload to the cable, the process 1000 proceeds to the launch preparation process, as in 1026, as described herein with respect to FIG. 7.

Returning to box 1014, at which point in the example process 1000 it has been determined that the next aerial vehicle carries a payload to be launched and the final aerial vehicle is no longer attached to the second, free end of the cable, it may be determined whether one or more of the aerial vehicles can slide along or change their positions along the cable, as in 1014.

If it is determined that no aerial vehicle can slide along or change their positions along the cable, then the process 1000 may proceed to retract any free cable sections, as in 1024. In some implementations, this example process flow determines that multiple aerial vehicles carry payloads to be launched, and that one or more of the aerial vehicles coupled closest to the second, free end of the cable include discrete, retractable cable sections that can be coupled to form the cable, as described herein with respect to FIGS. 3A-3I and 4B. While FIG. 4B shows the cable section 410 as extending from a lower surface of the aerial vehicle, the cable section 410 may alternatively extend from an upper surface of the aerial vehicle, or from any other suitable location on the aerial vehicle. Accordingly, returning to box 1024, after a final aerial vehicle is launched, any extendible/retractable cable section carried by the launched final aerial vehicle may be retracted. In addition, any extendible/retractable cable section carried by the next aerial vehicle that was previously coupled to the launched final aerial vehicle may also be retracted. In some implementations, only a portion of the aerial vehicles closest to the second, free end of the cable may carry payloads and include discrete, retractable cable sections that can be coupled to form the cable. In other implementations, all aerial vehicles forming part of the launch system may include discrete, retractable cable sections.

Following successful retraction of the free cable sections, if any, by the next aerial vehicle, the next aerial vehicle becomes the final aerial vehicle coupled to the cable, and the process 1000 proceeds to the launch preparation process, as in 1026, as described herein with respect to FIG. 7.

Returning to box 1014, if it is determined that one or more aerial vehicles can slide along or change their positions along the cable, then the process 1000 may proceed to decouple the next aerial vehicle from the cable, as in 1016, slide or change the position of the next aerial vehicle to the next outer position on the cable, as in 1018, and/or couple the next aerial vehicle to the next outer position on the cable, as in 1020. In some implementations, this example process flow determines that multiple aerial vehicles carry payloads to be launched, and that one or more of the aerial vehicles coupled closest to the second, free end of the cable can decouple from a current position on the cable, slide or move along the cable toward the second, free end, and/or couple to the cable at a next outer position of the cable, as described herein with respect to FIGS. 3A-4A. Accordingly, returning to boxes 1016, 1018, 1020, after decoupling, moving along, and/or coupling the next aerial vehicle to the next outer position, e.g., moving the next aerial vehicle to the final attachment point at the second, free end of the cable, it may be determined whether one or more aerial vehicles that are capable of moving along the cable have moved one position toward the second, free end, as in 1022. If not, the process 1000 may return to box 1016 to move the next aerial vehicle that has not yet been moved to a corresponding next outer position. This process described by boxes 1016-1022 may repeat until one or more aerial vehicles that are capable of moving along the cable have moved one position toward the second, free end. In some implementations, only a portion of the aerial vehicles closest to the second, free end of the cable may carry payloads and be configured to move along the cable. In other implementations, all aerial vehicles coupled to the cable may be configured to move along the cable.

In further implementations, not all attachment points along the cable may be coupled thereto by an aerial vehicle. For example, based at least in part on the launch parameters, aerial vehicles may be strategically coupled to selected attachment points along the cable in order to facilitate creation, propagation, and/or acceleration of the waveform along the cable to launch payloads. Further, for examples in which the cable has at least one or more portions of continuous attachment points along its length, as described herein with respect to FIG. 4A, the selected attachment points for aerial vehicles along such portions may be precisely determined, based at least in part on the launch parameters, in order to facilitate creation, propagation, and/or acceleration of the waveform along the cable.

Following successful movement of one or more aerial vehicles toward the second, free end of the cable, the next aerial vehicle becomes the final aerial vehicle coupled to the cable, and the process 1000 proceeds to the launch preparation process, as in 1026, as described herein with respect to FIG. 7.

Figure 11:
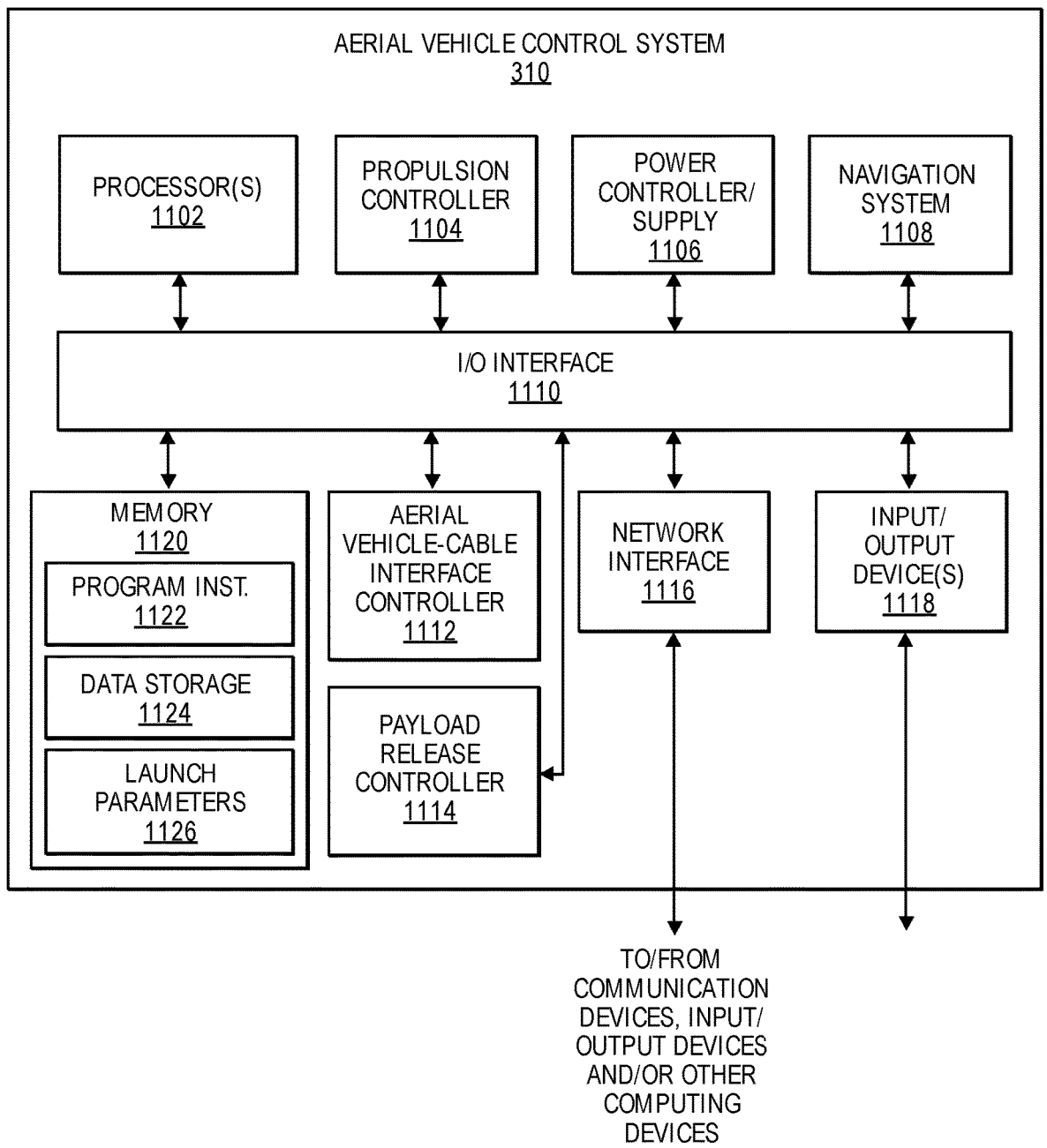
FIG. 11 is a block diagram illustrating various components of an aerial vehicle control system, according to an implementation.

FIG. 11 is a block diagram illustrating various components of an example aerial vehicle control system 310, according to an implementation. In various examples, the block diagram may be illustrative of one or more aspects of the aerial vehicle control system 310 that may be used to implement the various systems and processes discussed above. In the illustrated implementation, the aerial vehicle control system 310 includes one or more processors 1102, coupled to a non-transitory computer readable storage medium 1120 via an input/output (I/O) interface 1110. The aerial vehicle control system 310 may also include a propulsion controller 1104, a power controller/supply module 1106 and/or a navigation system 1108. The aerial vehicle control system 310 further includes an aerial vehicle-cable interface controller 1112, a payload release controller 1114, a network interface 1116, and one or more input/output devices 1118.

In various implementations, the aerial vehicle control system 310 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, vehicle characteristics, retraction mechanism characteristics, cable characteristics, aerial vehicle characteristics, payload data, launch paths, launch parameters, and/or data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and launch parameters 1126, respectively. In other implementations, program instructions, data and/or launch parameters may be received, sent or stored upon different types of computer-accessible media, such as non-transitory media, or on similar media separate from the non-transitory computer readable storage medium 1120 or the aerial vehicle control system 310. Launch parameters may include, for example, the power, speed, and/or acceleration of the vehicle, the retracting force, speed, and/or acceleration of the retraction mechanism, the length, diameter, and/or flexibility of the cable, the thrusting force, speed, and/or acceleration of the one or more aerial vehicles, other factors or operational characteristics related to components of the launch system, payload characteristics such as a destination, a distance, a speed, a trajectory, an altitude, an eccentricity, an inclination, a mass or weight, or other payload characteristics, wind speed or direction, other environmental factors, etc.

Generally speaking, a non-transitory, computer readable storage medium may include storage media or memory media such as magnetic or optical media, e.g., disk or CD/DVD-ROM, coupled to the aerial vehicle control system 310 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The propulsion controller 1104 communicates with the navigation system 1108 and adjusts the operational characteristics of each propulsion mechanism to guide the aerial vehicle along a determined launch path and/or to perform other navigational maneuvers. The navigation system 1108 may include a GPS or other similar system than can be used to navigate the aerial vehicle to and/or from a location. The aerial vehicle-cable interface controller 1112 communicates with components of the aerial vehicle-cable interface, as discussed above, and controls the coupling, movement, and/or decoupling of the aerial vehicle relative to the cable, as well as the extension/retraction of discrete cable sections, if applicable. For example, an aerial vehicle may couple to the cable at a first attachment point when launching a first payload, decouple from the first attachment point following completion of the launch, move to a second attachment point on the cable, couple to the second attachment point when launching a second payload, and/or extend/retract a discrete cable section carried by the aerial vehicle.

The aerial vehicle control system 310 may also include a payload release controller 1114. The payload release controller 1114 may communicate with components of the aerial vehicle that receive, retain, release, and/or launch the payload as discussed above. The payload release controller 1114 may provide instructions to grasp or receive a payload, hold the payload within the aerial vehicle, release the payload from the aerial vehicle, and/or launch the payload during the launch process.

Figure 12:
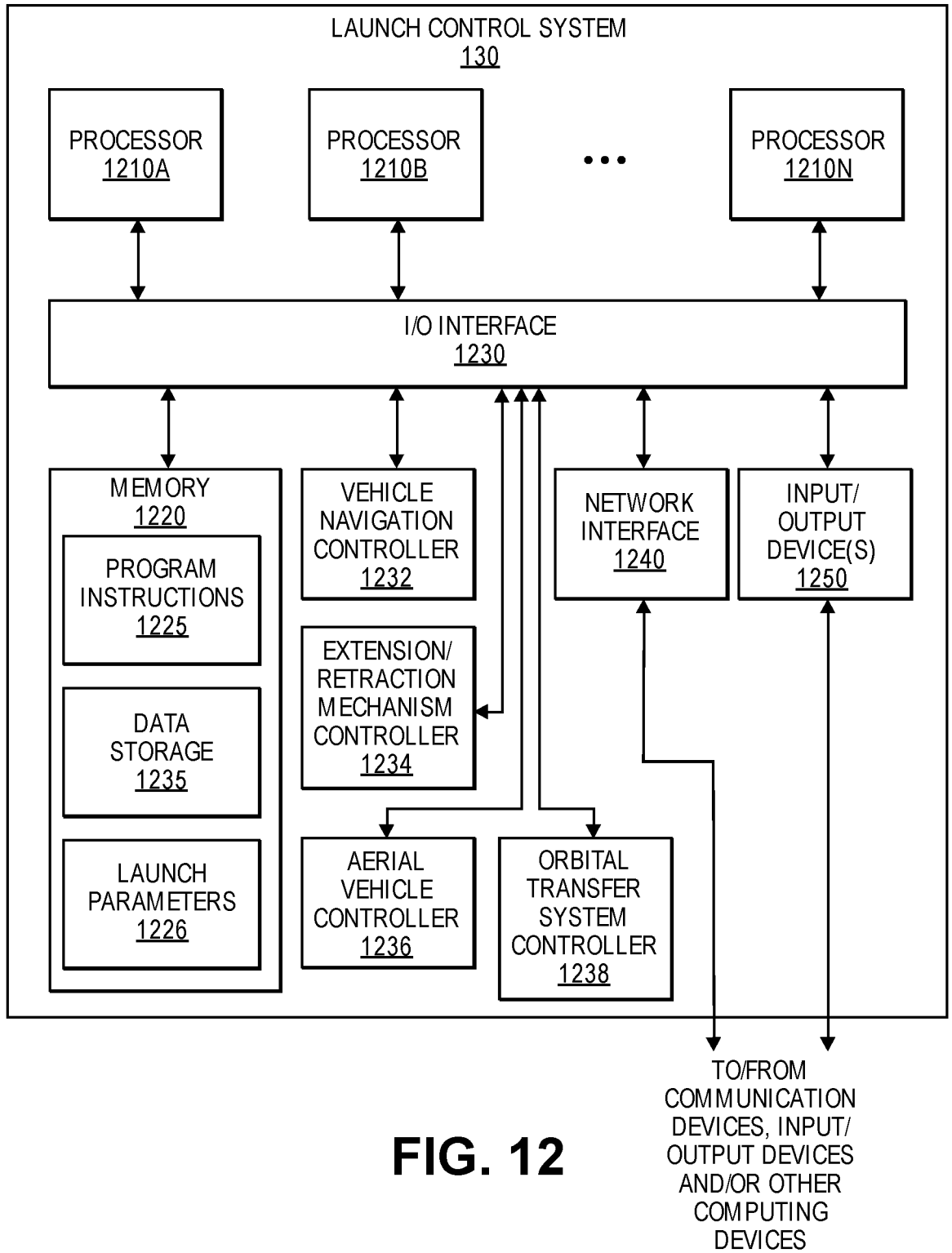
FIG. 12 is a block diagram illustrating various components of a launch control system, according to an implementation.

The network interface 1116 may be configured to allow data to be exchanged between the aerial vehicle control system 310, other devices attached to a network, such as other computer systems, the launch control system 130 described with respect to FIG. 12, the vehicle, the power source, the retraction mechanism, aerial vehicle control systems of other aerial vehicles, and/or the orbital transfer system. For example, the network interface 1116 may enable wireless communication between numerous aerial vehicles. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1118 may, in some implementations, include one or more displays, image capture devices, thermal sensors, infrared sensors, time of flight sensors, accelerometers, pressure sensors, weather sensors, etc. Multiple input/output devices 1118 may be present and controlled by the aerial vehicle control system 310. One or more of these sensors may be utilized to assist in the launch process as well as further operations following launch.

As shown in FIG. 11, the memory may include program instructions 1122 which may be configured to implement the example processes and/or sub-processes described above. The data storage 1124 may include various data stores for maintaining data items that may be provided for determining launch paths, operating the aerial vehicles to facilitate creation, propagation and/or acceleration of waveforms along the cable, receiving, retaining, and/or releasing payloads, coupling to, repositioning along, and/or decoupling from the cable, extending or retracting discrete cable sections, continuing flight operations following launch, coordinating operations with the orbital transfer system, etc. The launch parameters 1126 may include, for example, the power, speed and/or acceleration of the vehicle, the retracting force, speed, and/or acceleration of the retraction mechanism, the length, diameter, and/or flexibility of the cable, the thrusting force, speed, and/or acceleration of the one or more aerial vehicles, other factors or operational characteristics related to components of the launch system, payload characteristics such as a destination, a distance, a speed, a trajectory, an altitude, an eccentricity, an inclination, a mass or weight, or other payload characteristics, wind speed or direction, other environmental factors, etc.

FIG. 12 is a block diagram illustrating various components of an example launch control system 130, according to an implementation. Various operations of a launch control system, such as those described herein, may be executed on one or more computer systems, interacting with various other devices, according to various implementations. In the illustrated implementation, the launch control system 130 includes one or more processors 1210A, 1210B through 1210N, coupled to a non-transitory computer-readable storage medium 1220 via an input/output (I/O) interface 1230. The launch control system 130 further includes a network interface 1240 coupled to the I/O interface 1230, and one or more input/output devices 1250. In some implementations, it is contemplated that the launch control system may be implemented using a single instance of the launch control system 130, while in other implementations, multiple such systems or multiple nodes making up the launch control system 130 may be configured to host different portions or instances of the launch control system. For example, in one implementation, some data sources or services (e.g., coordinating operations of the vehicle, the retraction mechanism, and/or the aerial vehicles) may be implemented via one or more nodes of the launch control system 130 that are distinct from those nodes implementing other data sources or services (e.g., coordinating operations of the aerial vehicles and/or the orbital transfer system). In some implementations, a given node may implement the functionality of more than one component of the launch control system.

In various implementations, the launch control system 130 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 1220 as program instructions 1225, launch parameters 1226, and data storage 1235, respectively. In other implementations, program instructions and/or data may be received, sent or stored upon different types of computer-accessible media, such as non-transitory media, or on similar media separate from the non-transitory computer-readable storage medium 1220 or the launch control system 130. Generally speaking, a non-transitory, computer-readable storage medium may include storage media or memory media such as magnetic or optical media, e.g., disk or CD/DVD-ROM coupled to the launch control system 130 via the I/O interface 1230. Program instructions and data stored via a non-transitory computer-readable medium may be transmitted by transmission media or signals, such as electrical, electromagnetic, or digital signals, which may be conveyed via a communication medium, such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices in the device, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The launch control system 130 may include a vehicle navigation controller 1232. The vehicle navigation controller 1232 may communicate with the vehicle 102 (or a control system of the vehicle) in order to control and coordinate operations of the vehicle before, during, and/or after launch. For example, the vehicle navigation controller 1232 may provide instructions to control a heading, velocity, acceleration, and/or other operational characteristics of the vehicle in the context of any of the launch preparation, launch payload, launch recovery, and/or launch reload processes described above.

The launch control system 130 may also include an extension/retraction mechanism controller 1234. The extension/retraction mechanism controller 1234 may communicate with the extension/retraction mechanism 112 (or a control system of the extension/retraction mechanism) in order to control and coordinate operations of the extension/retraction mechanism before, during, and/or after launch. For example, the extension/retraction mechanism controller 1234 may provide instructions to control a velocity, acceleration, and/or other operational characteristics of the extension/retraction mechanism in the context of any of the launch preparation, launch payload, launch recovery, and/or launch reload processes described above.

The launch control system 130 may also include an aerial vehicle controller 1236. The aerial vehicle controller 1236 may communicate with the aerial vehicle control systems 310 of the aerial vehicles 300 in order to control and coordinate operations of the aerial vehicles before, during, and/or after launch. For example, the aerial vehicle controller 1236 may provide instructions to aerial vehicle control systems 310 of respective aerial vehicles to control the flight path, velocity, acceleration, lift, thrust, coupling, decoupling, and/or other operational characteristics of the aerial vehicles in the context of any of the launch preparation, launch payload, launch recovery, and/or launch reload processes described above.

The launch control system 130 may also include an orbital transfer system controller 1238. The orbital transfer system controller 1238 may communicate with the control system 520 of the orbital transfer system 500 in order to control and coordinate operations of the orbital transfer system during payload transfer operations. For example, the orbital transfer system controller 1238 may provide instructions to the control system 520 of the orbital transfer system 500 to control the orbital path, orbital velocity, orbital acceleration, rotation about its center of mass, payload grasping and/or release, tether extension/retraction, and/or other operational characteristics of the orbital transfer system in the context of payload transfer operations described above.

The network interface 1240 may be configured to allow data to be exchanged between the launch control system 130 and other devices attached to a network, such as other computer systems, the vehicle 102, the power source 104, the retraction mechanism 112, the aerial vehicle control systems 310 of aerial vehicles 300 described with respect to FIG. 11, and/or the orbital transfer system 500. In various implementations, the network interface 1240 may support communication via wired or wireless general data networks, such as any suitable type of Ethernet network. For example, the network interface 1240 may support communication via telecommunications/telephony networks such as analog voice networks or digital fiber communications networks, via storage area networks such as Fibre Channel SANs, or via any other suitable type of network and/or protocol.

Input/output devices 1250 may, in some implementations, include one or more displays, projection devices, audio output devices, keyboards, keypads, touchpads, scanning devices, voice or optical recognition devices, or any other devices suitable for entering or retrieving data by the launch control system 130. Multiple input/output devices 1250 may be present in the launch control system 130 or may be distributed on various nodes of the launch control system 130. In some implementations, similar input/output devices may be separate from the launch control system 130 and may interact with one or more nodes of the launch control system 130 through a wired or wireless connection, such as over the network interface 1240.

As shown in FIG. 12, the computer-readable storage medium 1220 may include program instructions 1225 which may be configured to implement a launch control system and launch parameters 1226 and data storage 1235, which may comprise various tables, databases and/or other data structures accessible by the program instructions 1225. In one implementation, the program instructions 1225 may include various software modules configured to implement and coordinate operations of the various components of the launch system 100 and/or the orbital transfer system 500. The launch parameters 1226 and data storage 1235 may include various data stores for maintaining control and coordination between the various components of the launch system 100 and/or the orbital transfer system 500, such as data representing physical and/or operational characteristics of the vehicle, the power source, the retraction mechanism, the cable, the aerial vehicles, the payloads, and/or the orbital transfer system, including the grasping mechanism and the tether retraction mechanism, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 310 and the launch control system 130 are merely illustrative and are not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 310 and/or the launch control system 130 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 310 and/or the launch control system 130. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 310 and/or the launch control system 130 may be transmitted to the aerial vehicle control system 310 and/or the launch control system 130 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations and/or other launch control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A launch apparatus, comprising:
a marine vehicle comprising a power source;
a superconducting cable coupled at a first end to the marine vehicle via a winch, wherein a diameter of the superconducting cable tapers from the first end toward a second end distal from the first end;
a plurality of aerial vehicles spaced along and coupled to the superconducting cable, each of the plurality of aerial vehicles receiving power from the power source via the superconducting cable;
a payload carried by a final aerial vehicle of the plurality of aerial vehicles, the final aerial vehicle coupled to the second end of the superconducting cable; and
a controller in communication with the marine vehicle, the winch, and the plurality of aerial vehicles, the controller configured to at least:
instruct the marine vehicle to travel at a determined velocity and provide power to the plurality of aerial vehicles via the superconducting cable;
instruct the winch to wind the superconducting cable to cause a waveform to propagate along the superconducting cable from the first end to the second end;
instruct the plurality of aerial vehicles to cause the waveform to propagate along the superconducting cable toward the second end; and
instruct the final aerial vehicle to release the payload as the waveform reaches the second end, thereby launching the payload.

2. The launch apparatus of claim 1, wherein each of the plurality of aerial vehicles includes a propulsion mechanism including at least one of a propeller and a propeller motor, a fan, a jet, a turbojet, a turbofan, an electric jet, or a jet engine.

3. The launch apparatus of claim 1, wherein the waveform comprises a shape including at least one of a half wave, a full wave, or a loop, the waveform propagating along the superconducting cable at an initial speed at the first end and at a final speed at the second end, the final speed being greater than the initial speed.

4. The launch apparatus of claim 3, wherein a combination of the tapering diameter of the superconducting cable, the winding of the superconducting cable by the winch, and at least one of the shape or the initial speed of the waveform propagating along the superconducting cable causes the payload to be released at the final speed.

5. The launch apparatus of claim 1, wherein instructing the final aerial vehicle to release the payload comprises releasing, from the superconducting cable, the final aerial vehicle together with the payload.

6. An apparatus, comprising:
a vehicle comprising a power source;
a cable movably coupled at a first end to the vehicle;
at least one aerial vehicle coupled to a second end of the cable distal from the first end, the at least one aerial vehicle receiving power from the power source via the cable, and the at least one aerial vehicle carrying a payload; and
a controller in communication with the vehicle and the at least one aerial vehicle, the controller configured to at least:
instruct the vehicle to travel at a determined velocity and provide power to the at least one aerial vehicle via the cable;
cause a waveform to propagate along the cable from the first end to the second end; and
instruct the at least one aerial vehicle to release the payload as the waveform reaches the second end, thereby launching the payload.

7. The apparatus of claim 6, wherein the vehicle is at least one of a marine vehicle, an aerial vehicle, or a land-based vehicle.

8. The apparatus of claim 6, wherein the cable comprises a superconducting cable having a diameter that tapers from the first end to the second end.

9. The apparatus of claim 8, wherein the cable is movably coupled at the first end to the vehicle via a winch; and
wherein causing the waveform to propagate along the cable from the first end to the second end comprises instructing the winch to retract the cable to cause the waveform to propagate along the cable.

10. The apparatus of claim 9, wherein the at least one aerial vehicle comprises a plurality of aerial vehicles spaced along and coupled to the cable between the first end and the second end.

11. The apparatus of claim 10, wherein at least some of the plurality of aerial vehicles comprise propulsion mechanisms including at least one of propellers and propeller motors, fans, jets, turbojets, turbofans, electric jets, or jet engines that receive power from the power source via the cable.

12. The apparatus of claim 10, wherein at least some of the plurality of aerial vehicles comprise a fixed wing.

13. The apparatus of claim 10, wherein causing the waveform to propagate along the cable from the first end to the second end comprises instructing at least some of the plurality of aerial vehicles to introduce the waveform that propagates along the cable toward the second end, the waveform having an initial shape and an initial speed.

14. The apparatus of claim 13, wherein at least one of the tapering diameter of the cable, the retracting of the cable by the winch, or at least one of the initial shape or the initial speed of the waveform propagating along the cable causes the payload to be released at a final speed greater than the initial speed.

15. A method, comprising:
instructing a vehicle to travel at a determined velocity, the vehicle comprising a power source and a cable retractably coupled to the vehicle at a first end, a plurality of aerial vehicles being spaced along and coupled to the cable;
causing a retraction mechanism to retract the cable to cause a waveform to propagate along the cable from the first end to a second end distal from the first end; and
instructing a release of a payload from the second end of the cable as the waveform reaches the second end.

16. The method of claim 15, wherein the payload is one of a final aerial vehicle of the plurality of aerial vehicles at the second end, or carried by the final aerial vehicle at the second end.

17. The method of claim 15, further comprising:
instructing at least some of the plurality of aerial vehicles to decouple from the cable as the waveform propagates along the cable toward the second end.

18. The method of claim 15, further comprising instructing at least some of the plurality of aerial vehicles to cause the waveform to propagate along the cable toward the second end, the at least some of the plurality of aerial vehicles receiving power from the power source via the cable; and
wherein the waveform having an initial shape and an initial speed.

19. The method of claim 18, wherein at least one of a tapering diameter of the cable, the retracting of the cable by the retraction mechanism, or at least one of the initial shape or the initial speed of the waveform propagating along the cable causes the payload to be released at a final speed greater than the initial speed.

20. The method of claim 15, further comprising:
upon release of the payload from the final aerial vehicle, at least one of:
instructing the vehicle to stop;
at least one of stopping the retracting of the cable or extending the cable by the retraction mechanism; or
instructing at least some of the plurality of aerial vehicles to slow or stop a movement of the cable.

* * * * *